(12) United States Patent
Zhang

(10) Patent No.: US 11,902,873 B2
(45) Date of Patent: Feb. 13, 2024

(54) SYSTEM, METHOD AND APPARATUS FOR MANAGING NETWORK RESOURCES

(71) Applicant: Hang Zhang, Nepean (CA)

(72) Inventor: Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 23 days.

(21) Appl. No.: 17/078,033

(22) Filed: Oct. 22, 2020

(65) Prior Publication Data

US 2021/0127318 A1   Apr. 29, 2021

Related U.S. Application Data

(60) Provisional application No. 62/926,040, filed on Oct. 25, 2019.

(51) Int. Cl.
*H04W 40/20* (2009.01)
*H04W 28/16* (2009.01)
(Continued)

(52) U.S. Cl.
CPC ........... *H04W 40/20* (2013.01); *H04W 28/16* (2013.01); *H04W 40/12* (2013.01); *H04W 40/248* (2013.01)

(58) Field of Classification Search
CPC ..... H04W 40/20; H04W 28/16; H04W 40/12; H04W 40/248
See application file for complete search history.

(56) References Cited

U.S. PATENT DOCUMENTS 9,173,147 B2   10/2015   Gao et al.
10,820,263 B1 *  10/2020   Barton .................. H04W 48/16
(Continued)

FOREIGN PATENT DOCUMENTS

CN   101175298 A   5/2008
CN   101789806 A   7/2010
(Continued)

OTHER PUBLICATIONS

Huawei,"TP for TR37.842 AAS BS reference signal power accuracy", 3GPP TSG-RAN WG4 Meeting #78, R4-160946, Malta, Feb. 15-19, 2016,Total 4 Pages.

*Primary Examiner* — Barry W Taylor

(57) ABSTRACT

There is provided a system, a method and an apparatus for managing network resources. The system includes a plurality of wireless entities including a mobile wireless entity and a fixed location wireless entity. The system further includes a plurality of computing devices, each of the plurality of computing devices including a processor and a memory storing instructions, the instructions when executed by the processor cause the plurality of computing devices to provide a location based media access (LOMA) map manager and a LOMA path manager, the LOMA map manager configured to generate and maintain a plurality of LOMA map, each of the plurality of LOMA maps including a plurality of LOMA zones, wherein a plurality of wireless communications resources used for communication between the plurality of wireless entities are associated with each of the plurality of LOMA zones, the LOMA path manager configured to manage communications using the wireless communications resources between the wireless entities. A technical effect of the embodiment may be the provision of semi-static management of communication resources and dynamic autonomous access to communication resources.

18 Claims, 18 Drawing Sheets

(51) Int. Cl.
*H04W 40/12* (2009.01)
*H04W 40/24* (2009.01)

(56) References Cited

U.S. PATENT DOCUMENTS

| | | |
|---|---|---|
| 2003/0078046 A1 | 4/2003 | Seo |
| 2010/0039948 A1* | 2/2010 | Agrawal ............ H04W 72/541 |
| | | 370/252 |
| 2011/0195713 A1 | 8/2011 | Ramasamy et al. |
| 2015/0063144 A1 | 3/2015 | Kozat |
| 2016/0323754 A1* | 11/2016 | Friday .................... H04W 4/80 |
| 2017/0078932 A1* | 3/2017 | Yang ..................... H04W 36/16 |
| 2019/0044609 A1 | 2/2019 | Winkle et al. |
| 2021/0073702 A1* | 3/2021 | Yoon .................... H04W 36/06 |
| 2021/0076441 A1* | 3/2021 | Guha .................... H04W 40/20 |
| 2021/0084577 A1* | 3/2021 | Wakabayashi ........ H04W 4/024 |
| 2022/0069876 A1* | 3/2022 | Xue ....................... H01Q 19/30 |

FOREIGN PATENT DOCUMENTS

| | | |
|---|---|---|
| EP | 3043611 B1 | 7/2019 |
| WO | 2019133049 A1 | 7/2019 |

* cited by examiner

800

| Zone of target entity | master_id |
|---|---|
| Z1 | R0 (no overlap zone) |
| Z2 | R0 (no overlap zone) |
| Z3 | R1 (overlap zone) |
| Z4 | |
| Z5 | |
| Z6 | |
| Z7 | |
| Z8 | |
| Z9 | R3 (overlap zone) |
| Z10 | R0 (no overlap zone) |

| Zone of target entity | master_id |
|---|---|
| Z1 | R0 (no overlap zone) |
| Z2 | |
| Z3 | R2 (overlap zone) |
| Z4 | R5 |
| Z5 | R4 |
| Z6 | |
| Z7 | |
| Z8 | |
| Z9 | |
| Z10 | |

| Zone ID | Resource |
|---------|----------|
| Z1 | R0 |
| Z2 | R0 |
| Z3 | R1, R2 |
| Z4 | R5, R1 |
| Z5 | R4, R1, R3 |
| Z6 | R0 |
| Z7 | -- |
| Z8 | -- |
| Z9 | R3, R2 |
| Z10 | R0, R4 |
| Z11 | R0 |
| Z12 | R0 |

1300

| Zone ID | Resource |
|---|---|
| Z1 | R0 |
| Z2 | R1, R2 |
| Z3 | R5, R6 |
| Z4 | R4, R1, R3 |
| Z5 | R2 |
| Z6 | R0 |
| Z7 | R0 |
| Z8 | R2 |

| Zone ID of sending entity | master_id |
|---|---|
| Z1 | R0 |
| Z2 | R2 |
| Z3 | |
| Z4 | |
| Z5 | R2 |
| Z6 | |
| Z7 | |
| Z8 | |

| Zone ID of sending entity | master_id |
|---|---|
| Z1 | |
| Z2 | R2 |
| Z3 | R5 |
| Z4 | R4 |
| Z5 | |
| Z6 | |
| Z7 | |
| Z8 | |

| Zone ID | Tx Resource | Rx Resource |
|---------|-------------|-------------|
| Z1 | R1 | R10 |
| Z2 | R5 | R7 |
| Z3 | R2 | R6 |
| Z4 | R1 | R5 |
| Z5 | R8 | R10 |
| Z6 | R3 | R7 |
| Z7 | ... | ... |

FIG. 16

SYSTEM, METHOD AND APPARATUS FOR MANAGING NETWORK RESOURCES

CROSS-REFERENCE TO RELATED APPLICATIONS

This application claims the benefit of priority to U.S. patent application Ser. No. 62/926,040 entitled "Method and apparatus for Location Based Multiple Access (LOMA)" filed Oct. 25, 2019, hereby incorporated by reference in its entirety.

FIELD OF THE INVENTION

The present invention pertains to the field of cellular networks and in particular to a system, a method and an apparatus for managing network resources so that network entities can be organized for resource management and control.

BACKGROUND

Present day cellular network topology may best be characterized as 'cell centric' and is organized by base stations which provide network coverage over a geographic area. Multiple base stations may exist in a particular area and a network of cellular base stations may provide coverage over a wide geographic area. Base stations handle a variety of wireless traffic include voice and data that have different traffic patterns and requirements.

However, the traffic requirements of each wireless entity that connects to a base station may have different requirements depending on the entity itself, the type, speed, and amount of traffic to be transmitted and received, quality of service (QoS) requirements, and any number of other factors.

Future networks are expected to utilize new techniques, such as artificial intelligence (AI) and Big Data services, and incorporate new types of devices, such as Internet-of-Things (IoT) devices. These future changes will benefit from new and flexible network topologies such as peer-to-peer (P2P), mobile peer-to-peer (MP2P), point-to multipoint (P-MP), and others. This will also increase the variety of traffic pattern types such as bursty and session-based traffic. It likely be difficult to efficiently manage and control these evolving and future networks and entities using the present cell centric approach.

Therefore, there is a need for improved methods of organizing wireless entities for resource management and control in cellular networks that is not subject to one or more of the limitations of the prior art.

This background information is provided to reveal information believed by the applicant to be of possible relevance to the present invention. No admission is necessarily intended, nor should be construed, that any of the preceding information constitutes prior art against the present invention.

SUMMARY

According to as aspect of the present disclosure, there is provided a system for managing network resources. The system includes a plurality of wireless entities including a mobile wireless entity and a fixed location wireless entity. The system further includes a plurality of computing devices, each of the plurality of computing devices including a processor and a memory storing instructions, the instructions when executed by the processor cause the plurality of computing devices to provide a location based media access (LOMA) map manager and a LOMA path manager, the LOMA map manager configured to generate and maintain a plurality of LOMA map, each of the plurality of LOMA maps including a plurality of LOMA zones, wherein a plurality of wireless communications resources used for communication between the plurality of wireless entities are associated with each of the plurality of LOMA zones, the LOMA path manager configured to manage communications using the wireless communications resources between the wireless entities. A technical effect of the embodiment may be the provision of semi-static management of communication resources and dynamic autonomous access to communication resources.

In some embodiments, the LOMA map manager communicates with the plurality of wireless entities to send and receive management messages to update the plurality of LOMA maps. In some embodiments, the LOMA path manager is configured to manage network path routing for traffic data between network nodes and user equipments (UEs).

According to another aspect of the present disclosure, there is provided a method for managing transmission resources for a communication network. The method includes detecting, by a plurality of second wireless entities, one or more of high power pilot transmissions and low power pilot transmissions sent from a plurality of first wireless entities. The method further includes each of the second wireless entities, transmitting to a location based media access (LOMA) map manager, a message including information indicative of a detected signal strength of the high power pilot transmission and a detected signal strength of the low power pilot transmission. A technical effect of the embodiment may be the provision of semi-static management of communication resources and dynamic autonomous access to communication resources at least in part based on location of wireless entities and detectable transmissions by the wireless entities.

In some embodiments, each of the plurality of first wireless entities is a network node (NN) and each of the plurality of second wireless entities is a user equipment (UE) and wherein the message transmitted by a particular UE includes a location at which the particular UE detected the high power pilot transmission and a location at which the particular UE detected the low power pilot transmission. In some embodiments, the method further includes allocating, by the LOMA map manager, downlink (DL) transmission resources to each of a plurality of zones, the allocating at least in part based on the detected signal strengths of the high power pilot transmissions, the detected signal strengths of the low power pilot transmissions and the locations of the plurality of UEs, the allocation of the plurality of DL transmission resources stored in one or more LOMA maps, and wherein the location of the particular UE is indicative of the one or more zones in which the particular UE detected the high power pilot transmission and the low power pilot transmission. In some embodiments, each of the LOMA maps includes a NN DL map and a UE DL map, wherein the NN DL map associates the DL transmission resources and the one or more zones and wherein the UE DL map associates DL reception resources and one or more zones and the particular UE monitors the DL reception resources allocated to the one or more zones associated with the particular UE. In some embodiments, upon detection, by the particular UE, of one or more packets on the DL reception resources allocated to the one or more zones associated with the particular UE, the particular UE further decodes the one or more packets. A technical effect of one or more of these embodiments may be the provision of semi-static management of downlink communication resources and uplink communication resources as well as dynamic access to the downlink communication resources and uplink communication resources.

In some embodiments, upon receipt of one or more data packets destined for the particular UE by a gateway of the communication network, the method further includes communicating, by the gateway, with a LOMA path manager, regarding the particular UE and determining, by the LOMA path manager, location information of the particular UE. The method further includes receiving, by the gateway, a current location of the particular UE or a NN associated with the particular UE and routing, by the gateway, the one or more data packets to the NN associated with the particular UE, wherein routing is determined by checking an associated LOMA map. A technical effect of one or more of these embodiments may be the provision of semi-static management of downlink communication resources and uplink communication resources as well as dynamic access to the downlink communication resources and uplink communication resources.

In some embodiments, when the particular UE enters a new zone or a new LOMA zone, the particular UE transmits a location declaration message indicating a change in zone or a change in LOMA zone. In some embodiments, upon receipt of the location declaration message, the method further comprises updating, by a LOMA path manager, UE location information. A technical effect of one or more of these embodiments may be the provision of semi-static management of downlink communication resources and uplink communication resources as well as dynamic access to the downlink communication resources and uplink communication resources.

In some embodiments, each of the plurality of first wireless entities is a user equipment (UE) and each of the plurality of second wireless entities is a network node (NN) and the method further includes sending, by each of the plurality of UEs to the LOMA map manager, a message including information indicative of a location of a particular UE, a high power pilot ID associated with the high power pilot transmission transmitted by the particular UE and a low power pilot ID associated with the low power pilot transmission transmitted by the particular UE. In some embodiments, the method further includes allocating, by the LOMA map manager, uplink (UL) transmission resources to each of a plurality of zones, the allocating at least in part based on the detected signal strengths of the high power pilot transmissions, the detected signal strengths of the low power pilot transmissions and the locations of the plurality of UEs, the allocation of the plurality of UL transmission resources stored in a LOMA map, and wherein the location of a particular UE is indicative of the one or more zones associated with the particular UE, wherein a particular detected signal strength of the high power pilot transmissions and a particular detected signal strength of the low power pilot transmissions are associated with the particular UE based on the high power pilot ID and the low power pilot ID. A technical effect of one or more of these embodiments may be the provision of semi-static management of downlink communication resources and uplink communication resources as well as dynamic access to the downlink communication resources and uplink communication resources.

In some embodiments, the LOMA map includes a NN UL map and a UE UL map, wherein the NN UL map associates UL reception resources with one or more zones and wherein the UE UL map associates UL transmission resources with the one or more zones. In some embodiments, the NN UL map is used by a particular NN in order to identify one or more UL resources to be monitored for transmissions from one or more of the plurality of UEs. In some embodiments, the UE UL map is used by a particular UE in order to identify one or more UL resources to be used for transmissions. A technical effect of one or more of these embodiments may be the provision of semi-static management of uplink communication resources as well as dynamic access to the uplink communication resources.

According to another aspect of the present disclosure, there is provided an apparatus for managing transmission resources for a communication network, the apparatus comprising a processor and a memory storing machine executable instructions thereon. The instructions when executed by the processor configure the apparatus to detect one or more of high power pilot transmissions and low power pilot transmissions sent from a plurality of first wireless entities and transmit to a location based media access (LOMA) map manager, a message including information indicative of a detected signal strength of the high power pilot transmission and a detected signal strength of the low power pilot transmission.

In some embodiments, the message transmitted by the apparatus includes a location at which the apparatus detected the high power pilot transmission and a location at which the apparatus detected the low power pilot transmission. In some embodiments, a user equipment UE DL map associates DL reception resources with one or more zones and the apparatus monitors the DL reception resources allocated to the one or more zones associated with the apparatus. In some embodiments when the apparatus enters a new zone or new LOMA zone, the apparatus transmits a location declaration message indicating a change in zone or a change in LOMA zone.

Embodiments of the present invention provide methods, systems, and apparatuses for implementing a LOcation based Media Access (LOMA) method and a network architecture for enabling the LOMA scheme. A LOMA MAP is created to manage uplink (UL) and downlink (DL) resource units (RUs) and provides methods for network nodes (NNs) and user equipment (UE) to determine the DL and UL resources to be utilized when transmitting and receiving data. LOMA provides flexible zones, including coverage and tracking areas, to better allocate network resources (e.g. DL and UL resources). LOMA provides a point-to-point (P2P) protocol to distribute LOMA MAP and network information within a network.

BRIEF DESCRIPTION OF THE FIGURES

Further features and advantages of the present invention will become apparent from the following detailed description, taken in combination with the appended drawings, in which:

FIG. 8 illustrates a Tx MAP according to an embodiment.

FIG. 9 illustrates a Tx MAP according to another embodiment.

FIG. 13 illustrates a Tx MAP, according to embodiments.

FIG. 14 illustrates a Tx MAP according to embodiments.

FIG. 15 illustrates a Rx MAP according to embodiments.

FIG. 16 illustrates an embodiment of a point-to-point (P2P) LOMA MAP according to embodiments.

It will be noted that throughout the appended drawings, like features are identified by like reference numerals.

DETAILED DESCRIPTION

Figure 1A:
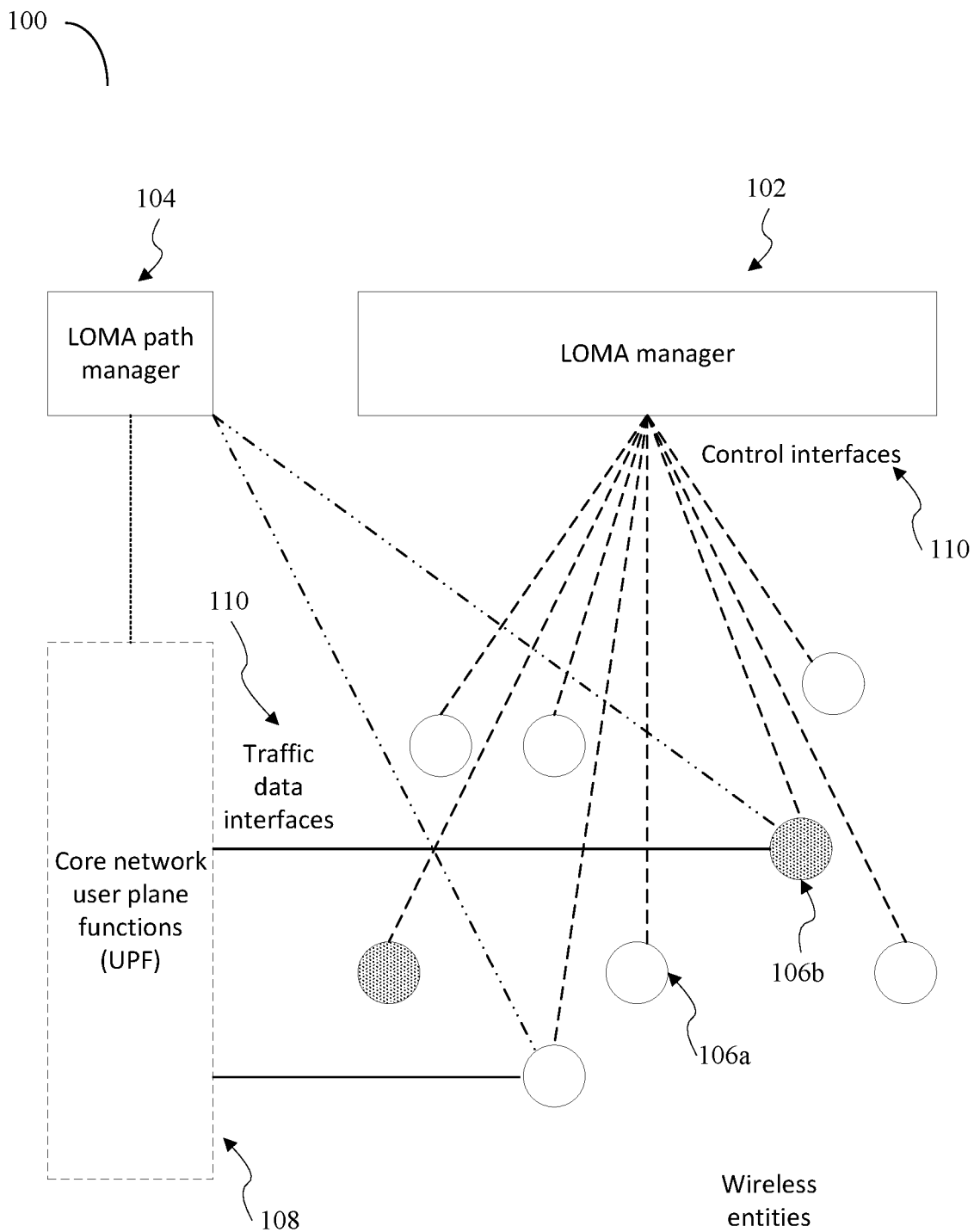
FIG. 1A illustrates a LOMA network architecture, according to embodiments.

Embodiments of the invention are related to a location-based method for network management that utilizes location information available from wireless entities for resource management and control. The LOcation based Multiple Access (LOMA) approach includes a joint semi-static resource management and dynamic autonomous resource access technology.

By way of generalized introduction, any device with wireless transmitter or receiver capability is referred to herein as a wireless 'entity.' Wireless entities share the need that they require wireless network resources for communication with other entities.

One example of a wireless entity is a user equipment (UE). As used herein, a UE includes any type of handset, sensor, vehicle, drone, etc. that may be operated autonomously or owned by a user or subscriber to a network service. A UE may be mobile or fixed in location.

A wireless entity may also include an infrastructure network node (NN), such as a base station, sensor, relay, roadside entity, etc., or a customer or user device (e.g., handset, sensor, vehicles, etc.) NNs may be network infrastructure deployed as network nodes which communicate with UEs and are typically fixed in a location. Embodiments relate to the management of common functions of wireless entities in an organized manner irrespective of how their functions may differ.

In embodiments a wireless entity may include both UEs and NNs that are participating in wireless communication in the network.

In embodiments, downlink resource units (DL-RU) can be used to define a pool of one or more DL resources used for downlink communications. In embodiments, uplink resource units (UL-RU) can be used to define a pool of one or more UL resources used for uplink communications. In embodiments, signaling resource units (S-RU) can be used to define a pool of one or more resource units that are used for control signaling transmissions. In embodiments, peer to peer resource units (P2P-RU) can be used to define a pool of one or more resources used for P2P communications. In embodiments, a geographic zone can be considered the smallest zone unit associated with a zone and a LOMA zone can be a single geographic zone or multiple adjacent geographic zones.

In embodiments, both DL and UL communications utilize RUs that provide the parameters used to control signaling transmission that wireless entities use to communicate. RUs may be organized into resource pools for management purposes. RUs may also be used for P2P communications between wireless entities.

RUs are associated with small geographic area or small 3D spaces referred to herein, as LOMA-zones. A LOMA-zone refers to one or multiple adjacent zones which are allocated the same RU or the same set of RUs.

Embodiment using a LOMA approach use location information as a basis for resource management. Locations may be absolute or relative and may include 2 dimensions (for example; north-south, and east-west), 3 dimensions (for example; north-south, east-west, and elevation), or other geographic coordinate systems.

LOMA is a zone centric design. A geographic area with wireless network coverage is divided into one or more zones of arbitrary size and shape. It is not required that zones be centered on base stations, access points, or other cellular network infrastructure. Instead the number, size, and shape of zones may be based on a number of criteria including number of devices, amount of traffic, characteristics of traffic, size and shape of a structure, etc. Zones may be fixed in location, size or shape, until updated or modified. Zones may also be changed dynamically based on any number of parameters such as devices using the zone, traffic, burstiness, QoS requirements, etc. A special case of zone would be infinite in size, or cover an entire geographic area, and all wireless entities would utilize the resources of the single zone.

In embodiments, one or more LOMA MAPs are used to manage resources in each LOMA zone. Static MAPs are managed by the network and used to define and organize network resources. Wireless entities may dynamically access autonomous resources based on MAPs and the location of wireless entities. Each zone may have multiple MAPs that comprise sets of pre-configured Tx and Rx RUs. All entities maintain and have access to MAP(s) which provide instruction on how to access required network resources. It will be readily understood that for the instant disclosure LOMA MAP and MAP can be used interchangeable.

In embodiments, LOMA includes techniques and methods for DL transmission from a NN to one or more UEs, for UL transmission from a UE to a NN, and for P2P communications between two wireless entities, such as between two UEs. The techniques described herein may also be used generally to communicate between other combinations of two or more wireless entities. Wireless entities are located within geographic areas which may then be divided into LOMA-zones.

DL transmission from NNs utilizes the strength of DL radio signals received or measured by UEs at the locations of each UE. NNs may be configured to transmit at different power levels and the received DL signal strength depends on a number of factors including the NNs transmit power, the UE's receiver, and the relative and absolute locations of the UEs and NN. Available DL radio resources are divided or grouped into resource units that may be abbreviated as "DL-RUs." DL-RUs may be allocated to each of these LOMA zones based on interference avoidance algorithms that may use AI based, inter nodes interference management techniques. The allocation of DL-RUs to LOMA-zones are described by LOMA MAPs that may be accessed by wireless entities such as NNs and UEs. DL transmission from NNs utilize MAPs referred to as NN-DL-MAPs. DL reception by UEs utilize MAPs referred to as UE-DL-MAPs.

According to embodiments, in order to create NN-DL-MAP and UE-DL-MAP, NNs can be configured to transmit their pilot transmissions using a certain number of power levels. UEs are informed to detect these pilot transmissions and report the corresponding received signaling strength of each of detected pilot transmissions with different power levels. Based on the reports from UEs, the LOMA MAP manager can determine the LOMA zone.

UL transmission from UEs to NNs utilize the strength of UL radio signals received or measured by NNs at the locations of each NN. Based on NN received strength of UL radio signal transmitted by UEs at certain location. UL signal strength depends on a number of factors including the UE's transmission power level, and the location of the UEs and NNs. As in the case of DL transmissions, geographic areas are divided into LOMA-zones. Available UL radio resources are divided into resource units referred to as UL-RUs. UL-RUs are allocated to LOMA zones based on interference avoidance algorithms that may use AI based, or inter nodes interference management techniques. The allocation of UL-RUs to LOMA-zones are described by MAPs that are referred to as NN-UL-MAPs. UL reception by NNs utilize NN-UL-MAPs to determine which UL-RUs to use. UE transmissions by UEs utilize UE-UL-MAPs to determine which UL-RUs to use.

According to embodiments, in order to create NN-UL-MAP and UE-UL-MAP, UEs are configured to transmit their UL pilot transmissions (or equivalent UL RUs) using multiple power levels. NNs are configured to detect all possible UL pilot transmissions. The NNs report the received signal strength of all detected UL pilot transmissions to LOMA MAP manager. Subsequently the LOMA MAP manager determines the LOMA zones.

In embodiments, control signaling transmission may use resource units referred to as S-RUs.

P2P communication, such as among UEs utilize P2P network resources divided and organized into P2P RUs. P2P RUs are allocated to zones and are described in MAPs referred to as P2P-MAPs.

FIG. 1A illustrates a network architecture according to an embodiment. The architecture comprises a LOMA manager 102, which may be a network function to manage LOMA MAPs, a LOMA path manger 104, which may be a network function to manage data routing between network nodes (NNs) and customer entities. Wireless entities such as entity 106a and entity 106b are in communication with the LOMA manager 102 and LOMA path manager 104. Wireless entities may communicate with each other as well as with core network user plane functions (UPF) 108.

In embodiments, the LOMA manager 102 and the LOMA path manager are both network functions. Network functions are instantiated upon the underlying resources of a data center. Functions utilize hardware and software resources from the pool of resources upon which they are instantiated. Functions act as independent entities and from a logical perspective they are indistinguishable from a physical node carrying out the same function. It should also be understood that in a sliced network where data centers provide the underlying resources upon which the slices are created, it is possible for a single network to have slices that support different versions of networks, so for example, in addition to having a virtualized network to support 5G traffic, a separate network slice can be created to support 4G networks. Traffic from wireless entities can be routed through network functions, to a gateway that provides access to a packet data network such as the Internet. Radio access services are typically provided by a RAN. Where a conventional RAN architecture was designed to be composed of discrete elements, such as eNodeBs, that were connected to the Core Network through a backhaul network, a C-RAN takes advantage of function virtualization to virtualize the Access Nodes of the network. Much as a physical Access Node, such as an eNodeB, was connected to an antenna by a front haul link, in an embodiment of a C-RAN Access Nodes, such as a gNodeB, are connected to antenna (or to a remote radio head (RRH)) through a front haul connection, but are functions that are instantiated upon compute resources of the network. If a gNodeB is divided into a Central Unit and a plurality of Distributed Units, the virtualized Distributed Units may in some embodiments be instantiated at or near the location of the antenna or RRH, while a Centralized Unit may be instantiated at a data center to connect and serve a plurality of geographically dispersed Distributed Units. A UE may be connected to the network through access node, which can provide radio access services through an antenna. The access node may be instantiated upon the compute and storage resources provided by a data center. Other access nodes may be connected to the same set of antennae, and also be instantiated upon the resources of the data center. It should be understood that the fronthaul connections linking the virtualized access nodes to the antennas or RRHs, may be direct connections, or they may form a fronthaul network. The integration of a CRAN into a core network may obviate or reduce the concerns associated with backhaul connections as the access node functions may be co-located with core network functions. A function may be instantiated at more than one data center and be part of a function migration process in which the function is moved through the network, or one of the instantiations may be an intentionally redundant instantiation. Both functions can be instantiated and configured, with only one of them active at a time, or they may both be active, but only one of them may be transmitting data to the UE.

The virtualization of the network functions allows a function to be located in the network at a location topologically close to the demand for the service provided by the function. Thus, an access node associated with an antenna can be instantiated upon data center resources at the data center closest to the antenna. Functions such as a LOMA manager 102, may be instantiated further away (in either or both of a topological or physical sense) from a LOMA path manager 104. Thus, the LOMA manager may be instantiated at one data center and the LOMA path manger may be located at another data center, which may be topologically closer to the UPF 108. In some network implementations, data centers can be arranged hierarchically, and different functions can be placed at different levels in the hierarchy.

Network slicing can be supported so that network slices can be created on underlying network resources. From within a slice, the slice will appear to be its own unique network, and it can serve as a set of underlying resources for any number of virtual networks. The resources of a slice can also be further sliced to create sub-slices. Network slicing allows the resources of a slice to be dedicated in a manner that ensure that two different slices relying upon the same underlying resources will not impact each other. These technologies can also allow the network to support network slicing to create isolated sub-networks with characteristics suited for the needs of the traffic that they are designed to support. The network may include a number of computing hardware resources that provide processing, memory, and storage resources to functions within the network. Connectivity between nodes within a network hosted within a slice, can be created using logical links. As a result, the topology of the network, and the services and functions offered within the network can be varied to provide different network connectivity options connecting the computing resources to each other and making it possible to provide service to mobile devices.

The LOMA manager 102 is a network function that manages LOMA MAPs. It is responsible for the generation and close-loop adaptation of MAPs. The LOMA manager 102 interfaces with wireless entities using LOMA related messages. For example, the LOMA manager 102 transmits environment learning requests and receives environment report messages from the wireless entities. MAPs are delivered by the LOMA manager 102 to wireless entities and to the LOMA path manager 104.

In embodiments, the LOMA manager 102 manages the generation of LOMA MAPs with the participation of wireless entities. The LOMA MAP generation procedure is initialized with a learning MAP that comprises a number of zones. For each zone in the MAP, one or more sets of Tx resources are defined that may be used by Tx announcement messages. Another set of resources is defined for environment report messages. In some embodiments, resource sets comprise definitions of resources required by wireless entities to transmit or receive data. Examples include the time, carrier, code, spatial parameters, power, and others.

The LOMA manager 102 utilizes the Tx resource information in the learning MAP to transmit environment learning requests to zones of interest. The environment learning request also distributes the learning MAP to wireless entities in the zones of interest. Wireless entities that successfully receive the environment MAP respond to the LOMA manager with an environment report message that includes radio environment observation collection information detected by the wireless entities. The LOMA manager analyzes the radio environment observation information received and utilizes these observations to generate one or more LOMA MAPs.

A fixed wireless entity such as a network node which has a fixed wireless or wireline connections to a network (e.g., base station, network relay node) will have its entity ID included in the MAP in the entry for the zone in which it is located.

The LOMA path manager 104 is a network function that manages traffic data routing between network nodes (NNs) and customer entities (such as UEs). The LOMA path manager 104 receives MAPs from the LOMA manager 102, receives and maintains location information of wireless entities, such as UEs, at the zone level or LOMA-zone level, and instructs DL UPF 108 data forwarding to selected network nodes based on known target wireless entity location. The LOMA path manager 104 also interfaces with core network functions, such as user plane functions (UPF) 108 and control plane functions. The LOMA path manager 104 also interfaces with wireless entities using location declaration messages which in some embodiments may be encrypted.

In order to enable efficient traffic data communication among entities, wireless (such as NNs and UEs) entities such as 106a and 106b include LOMA functions within, and may maintain information of the locations of target entities and the location of source entities in order to optimize wireless resource usage. This information can be acquired by using control messages transmitted between wireless entities or may be obtained from the LOMA path manager 104. LOMA functions within wireless entities may report their location at the zone level or at the LOMA-zone level to aid in DL traffic routing. Wireless entities may transmit transmission announcement (Tx announcement) messages to a LOMA manager 102. Wireless entities may transmit location declaration messages to a LOMA 104 path manager or other wireless entities. Wireless entities may transmit discovery messages to other wireless entities.

When generating LOMA MAPs, wireless entities collect and report radio environment observation information and transmit this information to the LOMA manager 102. Examples of information collected includes interference status within areas of interest to the LOMA manager 102. In some embodiments this is done in two phases; a learning phase, and a reporting phase. In the learning phase, a fixed entity (such as a network node), or a mobile entity (such as a UE), when moving into a new zone, accesses its Tx MAP and selects a set of Tx resources from the listed resources for that zone. In some cases, there may be multiple sets of Tx resources to select from and the wireless entity may select one based on any number of algorithms such as randomly selecting one set of Tx resources. The wireless entity then transmits a Tx announcement message which includes a zone ID using the Tx resources. All wireless entities monitor the specified Rx resources for Tx announcement messages and record physical layer data related to the received Tx announcement message. The recorded data may include parameters, such as received signal strength.

In reporting phase, the wireless entity selects one of the Tx resource sets from among the Tx resources indicated in its MAP for reporting purposes. It then sends an environment report message. The environment report message includes the zone ID of the zone where the sender is currently located and the recorded physical layer receiving and detection results. In some cases, the environment report message can be transmitted directly to a NN or to another wireless entity which can then relay the message to the NN. A wireless entity that receives an environment report can decide whether to relay it or not based on the zone ID. The decision can be made based on a number of different criteria. For example, it can compare the zone ID of the environment report message to its own zone, and only relay the environment report message if it is closer to the target NN than the sender of the environment report message. The relaying procedure may be repeated until the environment report message reaches a network node.

To avoid network congestion during the learning phase and during the reporting phase of this procedure, a wireless entity may selectively elect to participate in, or delay its participation in, the procedure using a random number check, or other method.

For the reporting procedure, a wireless entity can decide to send the report using one-hop transmission or multi-hop transmission using the appropriate Tx MAP.

An initial LOMA MAP can also be generated to seed a learning MAP or to load into wireless entities until a generated MAP is available. An initial MAP may be generated offline based on historic data or by training equipment to emulate or simulate network topology.

In embodiments, adjustments are made to MAPs as part of a continuous close-loop procedure.

In embodiments, environment learning requests, environment report messages, MAP delivery messages, location declaration messages, transmission announcements, location declarations, and discovery messages are all referred to as 'control messages.'

Figure 1B:
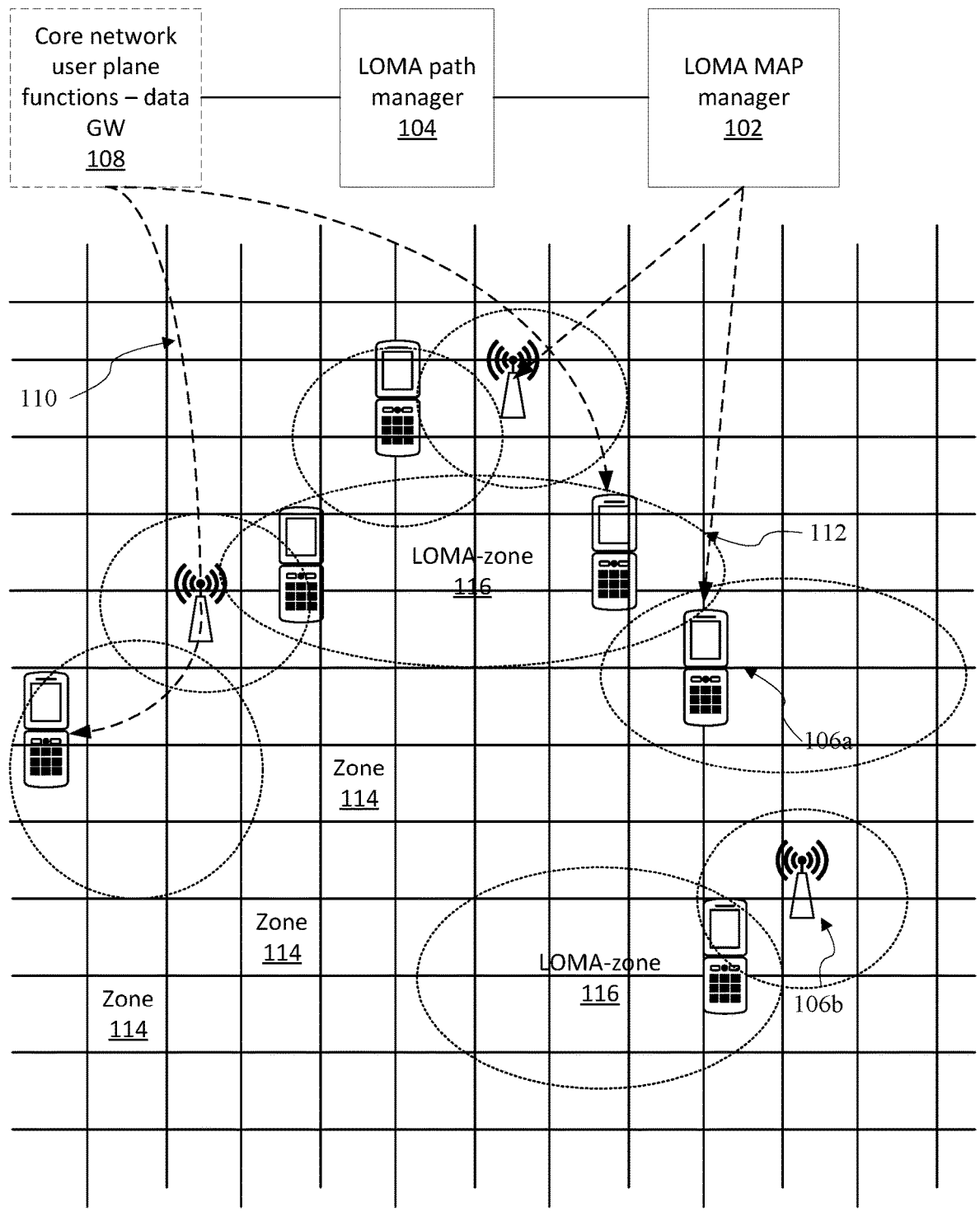
FIG. 1B illustrates an alternate view of a LOMA network architecture, according to embodiments.

FIG. 1B provides an alternate view of a LOMA network architecture, according to an embodiment, and in particular, illustrates the functions performed by the LOMA MAP manager 102. FIG. 1B illustrates a geographic area divided into zones 114 that, in this case, form a grid over the area. A number of LOMA-zones 116 are illustrated with dotted oval shapes. Though a LOMA-zone 116 may correspond to a zone 114, they do not have to, and in this illustration LOMA-zones 116 are formed within the geographic zone based on LOMA requirements described herein. For example, a geographic zone can be considered the smallest zone unit and a LOMA zone can be a single geographic zone or a multiple adjacent geographic zones. LOMA MAP manager 102 has the responsibilities of the generation and close-loop adaptation, maintenance and management of MAPs, interfacing with wireless entities, such as UE 106a and NN 106b, using LOMA messages, and interfacing with the LOMA path manager 104 in order to update LOMA MAPs.

In embodiments, LOMA Path manager 104 may be realized as a network function with the responsibility of managing traffic data routing between NNs and UEs for transmission from NNs to UEs. The LOMA Path manger 104 receives and maintains location information of UEs at a zone 114, at LOMA-zone 116 level, or at both a zone 114 and a LOMA-zone 116 level. The LOMA Path manager 104 provides control to DL user plane functions (UPFs), such as DL data gateways, to enable data forwarding to selected NNs based on known target UE locations. The LOMA Path manager 104 may also interface with core network functions, such as UPFs, or control plane functions (CM). The LOMA Path manager 104 also interfaces with UEs using messages. For example, UEs transmit control messages known as "location declaration messages" to the LOMA Path manager 104, which may be encrypted.

Wireless entities such as UE 106a and NN 106b also include functions to implement LOMA functions. Wireless entities provide information to enable the LOMA PATH manager to obtain interference status within an area where the LOMA manager is being utilized. For DL traffic routing, UEs report their location at the zone level 114, at the LOMA-zone 116, or at both the zone level 114, and the LOMA-zone 116 level. Mobile UEs transmit location declaration message sent to the LOMA path manager or other entities.

Figure 2:
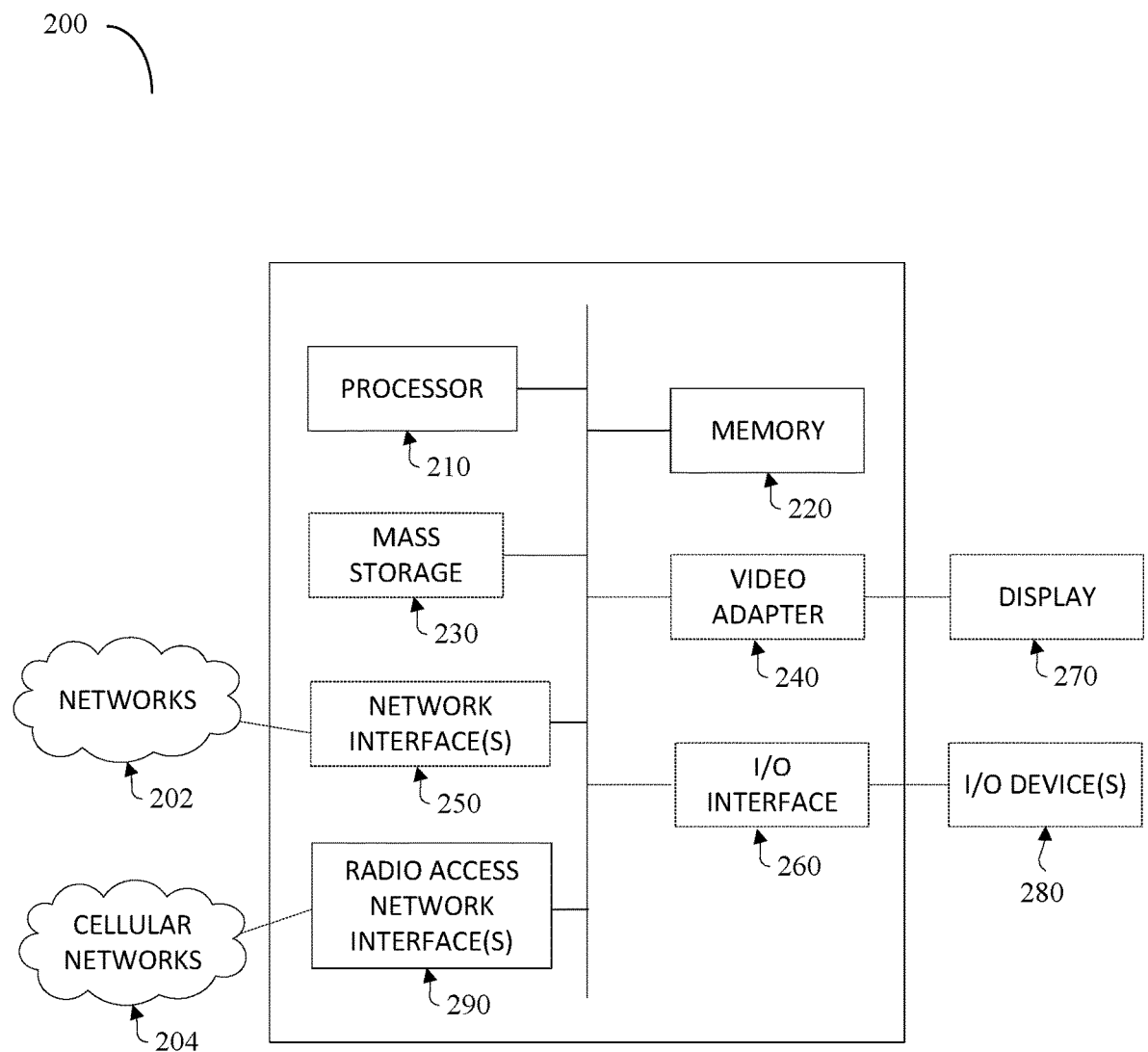
FIG. 2 illustrates of an electronic device used in embodiments.

FIG. 2 is a block diagram of an electronic computing device 200 illustrated within a computing and communications environment that may a wireless entity 106a 106b that is used for implementing the devices and methods disclosed herein. In some embodiments, the electronic device may be an element of communications network infrastructure used to implement a LOMA manager 102 or a LOMA path manager 104. Examples of network infrastructure include a base station (for example a NodeB, an enhanced Node B (eNodeB), a next generation NodeB (sometimes referred to as a gNodeB or gNB), a home subscriber server (HSS), a gateway (GW) such as a packet gateway (PGW) or a serving gateway (SGW) or various other nodes or functions within an evolved packet core (EPC) network. In other embodiments, the electronic device may be a wireless entity 106a 106b that connects to network infrastructure over a radio interface, such as a mobile phone, smart phone or other such device that may be classified as a User Equipment (UE). In some embodiments, electronic device 200 may be a Machine Type Communications (MTC) device (also referred to as a machine-to-machine (m2m) device), or another such device that may be categorized as a UE despite not providing a direct service to a user. In some references, an electronic device may also be referred to as a mobile device, a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc.

The electronic device 200 typically includes a processor 210, such as a Central Processing Unit (CPU), and may further include specialized processors such as a Graphics Processing Unit (GPU) or other such processor, a memory 220, a network interface 250 and a bus to connect the components of electronic device 200. The electronic device 200 may optionally also include components such as a mass storage device 230, a video adapter 240, and an I/O interface 260 (shown in dashed lines).

The memory 220 may comprise any type of non-transitory system memory, readable by the processor 210, such as static random access memory (SRAM), dynamic random access memory (DRAM), synchronous DRAM (SDRAM), read-only memory (ROM), or a combination thereof. In an embodiment, the memory 220 may include more than one type of memory, such as ROM for use at boot-up, and DRAM for program and data storage for use while executing programs. The bus may be one or more of any type of several bus architectures including a memory bus or memory controller, a peripheral bus, or a video bus.

The electronic device 200 may also include one or more network interfaces 250, which may include at least one of a wired network interface and a wireless network interface. As illustrated in FIG. 2, network interface 250 may include a wired network interface to connect to a network 202, and also may include a radio access network interface 290 for connecting to other devices over a radio link. When electronic device 200 is network infrastructure, the radio access network interface 290 may be omitted for nodes or functions acting as elements of the Core Network (CN) other than those at the radio edge (e.g. an eNB). When electronic device 200 is infrastructure at the radio edge of a network, both wired and wireless network interfaces may be included. When electronic device 200 is a wirelessly connected device, such as a User Equipment, radio access network interface 290 may be present and it may be supplemented by other wireless interfaces such as WiFi network interfaces. The network interfaces 250 290 allow the electronic device 200 to communicate with remote entities such as those connected to wired and wireless networks 202 204.

The mass storage 230 may comprise any type of non-transitory storage device configured to store data, programs, and other information and to make the data, programs, and other information accessible via the bus. The mass storage 230 may comprise, for example, one or more of a solid state drive, hard disk drive, a magnetic disk drive, or an optical disk drive. In some embodiments, mass storage 230 may be remote to the electronic device 200 and accessible through use of a network interface such as interface 250. In the illustrated embodiment, mass storage 230 is distinct from memory 220 where it is included and may generally perform storage tasks compatible with higher latency but may generally provide lesser or no volatility. In some embodiments, mass storage 230 may be integrated with a heterogeneous memory 220.

The optional video adapter 240 and the I/O interface 260 (shown in dashed lines) provide interfaces to couple the electronic device 200 to external input and output devices. Examples of input and output devices include a display 270 coupled to the video adapter 240 and an I/O device 280 such as a touch-screen coupled to the I/O interface 260. Other devices may be coupled to the electronic device 200, and additional or fewer interfaces may be utilized. For example, a serial interface such as Universal Serial Bus (USB) (not shown) may be used to provide an interface for an external device. Those skilled in the art will appreciate that in embodiments in which electronic device 200 is part of a data center, I/O interface 260 and Video Adapter 240 may be virtualized and provided through network interface 250.

In some embodiments, electronic device 200 may be a standalone device, while in other embodiments electronic device 200 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

As used herein, a "network" or "communication network" may serve various devices including but not necessarily limited to wireless devices. Such a network may include a radio access portion, a backhaul portion and a core network portion. The network may further comprise various virtualized components as will become readily apparent herein. While networks compliant with the Long Term Evolution (LTE) network standards, and those complying with the requirements of the Evolved Packet Core (EPC) can be implemented using network slicing, their fundamental design does not take advantage of, nor does it provide control for, network slicing and the use of virtualized functions. Discussions for the standardization of future mobile network design and architecture, including a so-called Fifth Generation (5G) networks have been started. New network architectures and functional elements are being discussed to take advantage of techniques such as network slicing, network function virtualization, as well as software defined networking, topology and protocols. The use of these different technologies allows for the creation of flexible networks that will allows for a core network employed by 5G networks to be built with various network technologies that allow for reconfigurability to suit various different needs.

Figure 3:
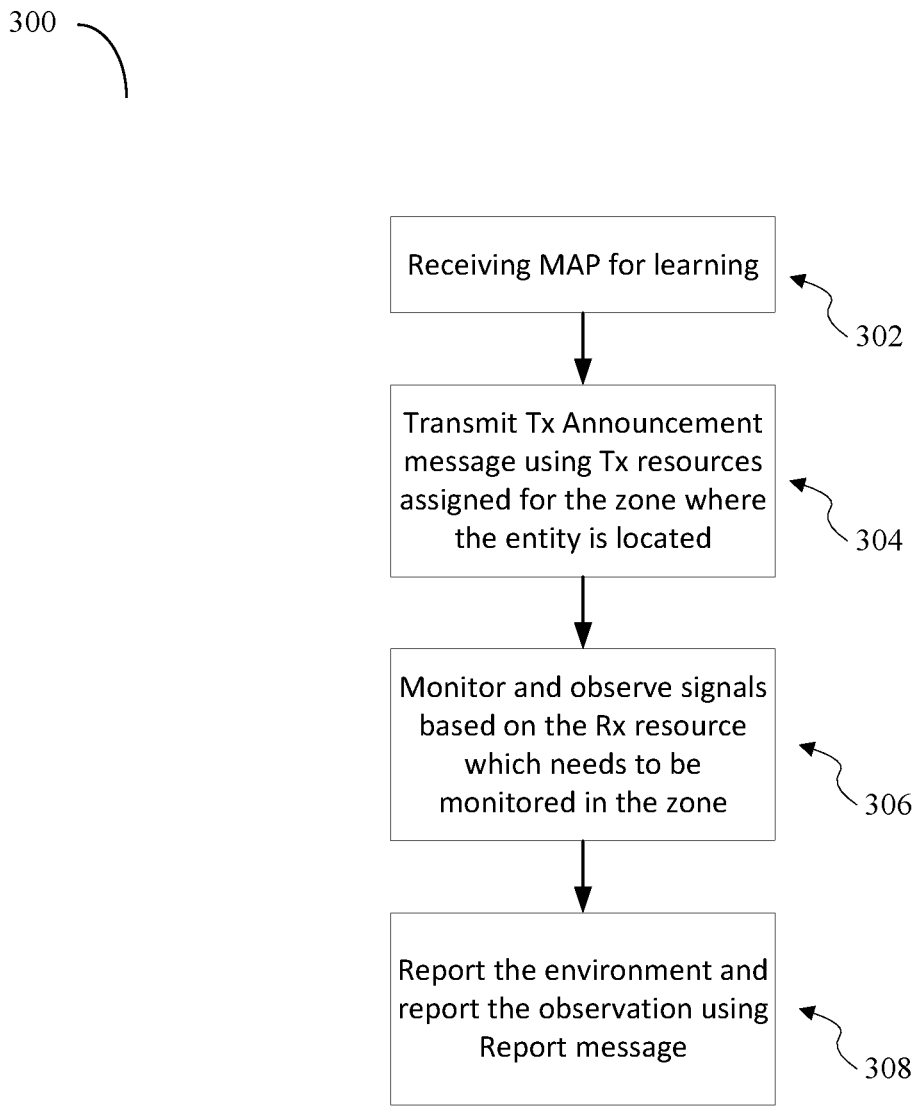
FIG. 3 illustrates a procedure for generating a LOMA MAP, according to embodiments.

FIG. 3 illustrates a LOMA MAP generation procedure 300 performed by the LOMA manager 102 according to an embodiment. The procedure starts with the LOMA manager 102 receiving a MAP for learning to provide a starting point in the creation of the MAP. The learning MAP comprises a list of zones as well as sets of Tx resources (RUs) that may be used for transmission to wireless entities within that zone. In step 304 the LOMA manager 102 selects a wireless entity to transmit a Tx announcement to using the Tx resources listed in the learning MAP to other wireless entities located in zones of interest. In step 306, wireless entities such as 106a and 106b will monitor the Rx resources listed in the learning MAP for the zone in which they are located. In step 306, wireless entities that successfully received the Tx announcement reply with an environment report message to the originating wireless entity reporting their observations of the received Tx announcement. The LOMA manager utilizes the received observations to create or update any required MAPs. Wireless entities continue to monitor the Rx resources indicated for their zone in their locally accessible MAPs to receive the new or updated MAP.

Embodiments include methods for the creation of a DL MAP (such as an NN-DL-MAP) using a multi-level power transmission scheme, which may be a two level scheme. When using high power pilot transmissions, NNs transmit at a higher level power on pilot channels or using other equivalent resource units (RUs). UEs monitor these pilot channels or RUs and report the received signal strength along with the UEs current location (zone ID or LOMA-zone) to the LOMA MAP manager. When using low power pilot transmission, NNs transmit at a lower level power on pilot channels or using other equivalent resource units (RUs). UEs monitor these pilots or RUs and report the received signal strength along with the UEs current location (zone ID or LOMA-zone) to the LOMA MAP manager. Based on the received signal strength and location information received, the LOMA MAP manager allocates resource units (RUs) to zones based on specified algorithms. The LOMA MAP manager can determine the LOMA zone and DL RU allocations to the LOMA zones. Various alternatives are possible, such as that NNs may transmit their pilot signals using multiple level of powers in sequence or transmit Tx announcement message using S-RUs. Then UEs may report received signal strengths to the LOMA MAP manager that include a list of NN IDs or pilot IDs, power level IDs, received signal strengths, etc.

Embodiments include methods for the creation of MAPs, for example, NN-DL-MAPs, UE-DL-MAPs, NN-UL-MAPs, UE-UL-MAPs, and P2P-MAPs. For the case of the DL MAPs, an NN makes multiple pilot transmissions to one or more UEs using two or more transmission power levels. Pilot transmissions may contain information such as transmit NN IDs, pilot IDs, or transmit power level IDs. In embodiments, a two level, high power and low power levels may be used. The high level pilot transmission may use a pilot channel or equivalent RUs. UEs are configured to monitor known pilot channels or equivalent RUs and report the received signal strength along with the UEs' current location, such as a zone ID, to the LOMA MAP manager 102. The low power pilot may use the same or a different pilot channel or equivalent RUs. UEs are configured to monitor known pilot channels or equivalent RUs and report the received signal strength along with the UEs', such as a zone ID, to the LOMA MAP manager 102. Based the information received from the UEs, the LOMA MAP manager 102 may allocate RUs to zones based on certain algorithms. In embodiments, NNs can send their pilot transmissions using multiple level of powers in sequence or transmit control messages referred to as "Tx announcement messages", using S-RUs. UEs report received signal strength to LOMA MAP manager 102 with a list of NN IDs or pilot IDs, power level IDs, and received signal strengths.

Figure 4:
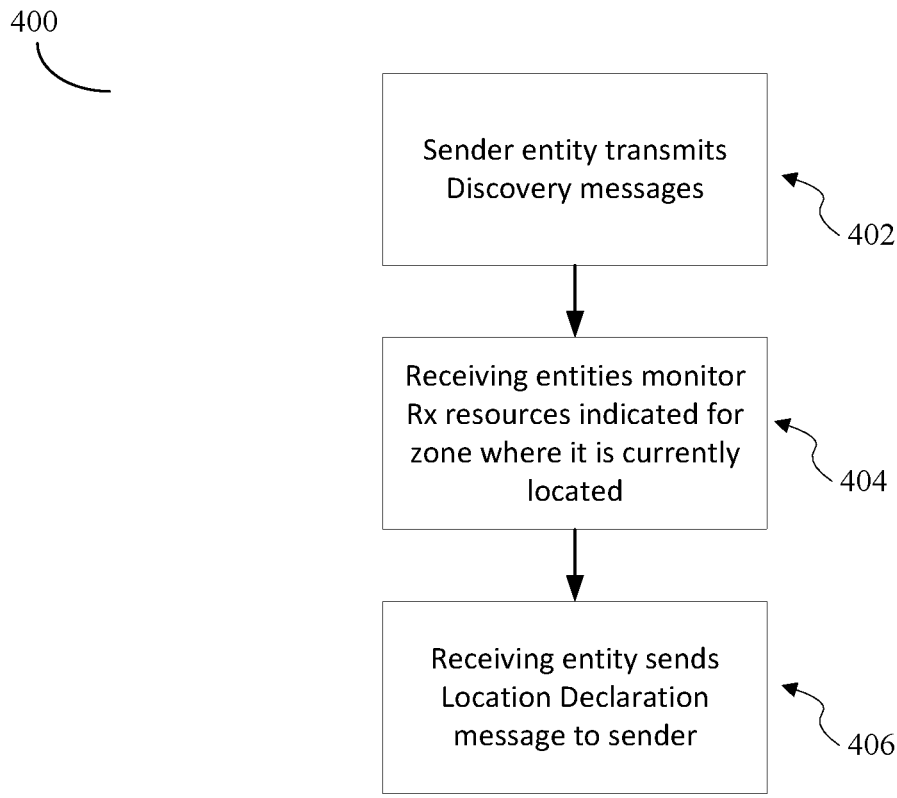
FIG. 4 illustrates a procedure for establishing connections between multiple wireless entities, according to embodiments.

FIG. 4 illustrates a procedure 400 for establishing connections between multiple wireless entities, for example, between wireless entity 106a and wireless entity 106b. The procedure 400 starts at step 402 when a sender wireless entity transmits a discovery message using the Tx resource indicated by its MAP. In step 404, wireless entities monitor the Rx resources indicated by the MAP for the LOMA-zone in which they are located. In step 406, the wireless entities that received the discovery message respond with a location declaration message to the sending wireless entity.

Figure 5A:
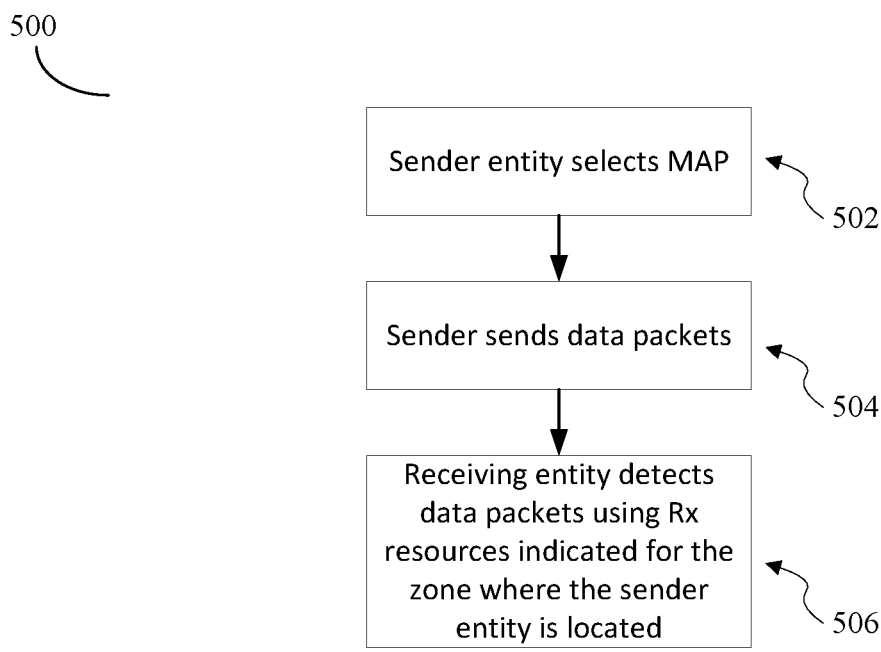
FIG. 5A illustrates a procedure for data transmissions among wireless entities, according to embodiments.

FIG. 5A illustrates a procedure 500 for data transmissions among wireless entities. In step 502 a sender wireless entity accesses its MAP to determine the Tx resources for transmission. In step 504 the sending wireless entity transmits data packets. In step 506 the receiving wireless entity receives the data packets using the Rx resources specified in the MAP as indicated for the zone where the sender entity is located.

Embodiments support multiple MAP types that may be broadly divided into MAPs for fixed wireless entities, such as cellular base stations, and for mobile wireless entities, such as UEs. Separate MAPs may also exist for DL and UL communications as well as P2P communications between wireless entities.

In embodiments, NNs such as cellular base stations with fixed locations (which may correspond to cellular network, 'cells') may use MAPs Such as NN-DL-MAPs and NN-UL-MAPs. MAPs used by base stations include entries for each zone accessible by the base station. Entries in the MAP for each zone include a set of Tx RUs and a set of Rx RUs to be utilized by the base station when transmitting to a zone or receiving transmissions from a zone. For transmission, a base station determines the Tx resource unit set based on the LOMA-zone where the targeted entity is located. The base station randomly selects one or multiple Tx resource units for transmission. For receiving, a base station determines the Rx resource unit set for monitoring based on the LOMA-zone where the sending entity is located. The base station then monitors all resource units of the set. Other fixed location wireless entities may also use the NN-UL-MAPs and NN-DL-MAPs.

Other wireless entities such as mobile devices and UEs use LOMA MAPs that may be referred to as UE-DL-MAPs and UE-UL-MAPs. MAP used by wireless entities include entries for each zone accessible by that wireless entity. For transmission, for each of zones, a set of Tx resource units is indicated. For receiving, for each of zones, a set of Rx resource units is indicated. For transmission, a wireless entity determines the Tx resource unit set based on zone where that wireless entity is currently located. The entity randomly selects one or multiple Tx resource units for transmission. For receiving, the wireless entity determines a Rx resource unit set for monitoring based on the zone where the entity is currently located in. The wireless entity monitors all resource units of the set.

In other embodiments, a first and second type of MAP is used to instruct transmissions. The first type of MAP is used to facilitate transmissions. A Tx resource map may be used in which for each defined zone, sets of Tx resources are defined. The Tx MAP may be stored by wireless entities for use with uplink (UL) traffic. In some embodiments, mobile wireless entities reference the zone in which they themselves are located.

The second type of MAP is a Rx MAP used to facilitate reception. The Rx resource MAP may be used to indicate to wireless entities which Rx resources must be monitored for each zone in order to receive data. For downlink (DL) transmissions, each network node utilizes an Rx resource MAP when the location of a target wireless entity is known. In some embodiments, mobile wireless entities reference the zone in which they themselves are currently located.

A third and fourth type of MAP is used to instruct receiving. The third type of MAP is a Tx resource-based MAP in which, for each zone, sets of Tx resources are indicated. This type of MAP is kept by NNs and used when the sending entity's location is known and may be used by NNs for uplink data. In some embodiments, fixed location wireless entities reference the zone of the target entity that will receive the traffic.

The fourth type of MAP is an Rx resource-based MAP where, for each zone, the set of resources that needs to be monitored is indicated. This type of MAP may be kept by customer entities for downlink (DL) data transmission. This fourth type of MAP, which may also be referred to as a BMS MAP, may also be used for broadcast or multicast transmission and reception. In this case, the BMS MAP includes a plurality of zones in which targets of a broadcast or multicast transmission are located, and the MAP specifies that all of the zones use the same Tx resource set.

In some embodiments multiple MAPs of the above types may be provided based on other criteria, such as transmission power. For example, there may be different MAPs for different slices, services, or groups.

In some embodiments, cellular or wireless network coverage area and tracking area (TA) are defined based on geographic zones. For each NN node the LOMA system indicates a list of zone IDs to define a default coverage area of the NN. If a NN needs to perform a broadcast service, the NN needs to verify that it may provide adequate communications coverage to these zones.

Location tracking area (TA) can be define as a list of zone IDs. If a paging service is indicated, the network needs to make sure that the message is able to be received in all zones in the TA.

Figure 5B:
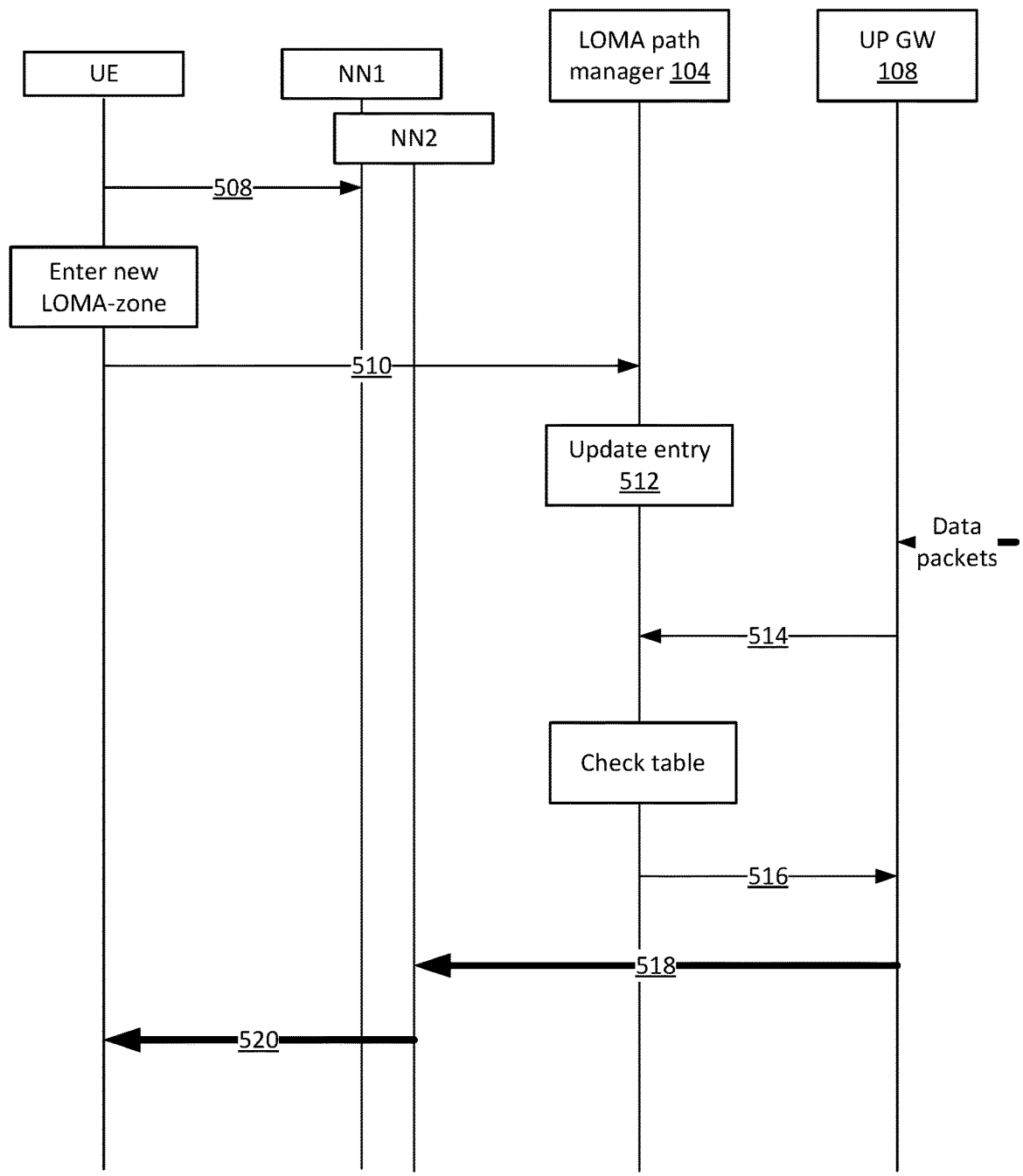
FIG. 5B illustrates a method for DL data transmission using LOMA MAPs, according to embodiments.

FIG. 5B illustrates a procedure for conducting DL data transmissions using MAPs, according to an embodiment. In step 508 the UE utilizes the UE-DL-MAP for the LOMA-zone where it is currently located to determine DL RUs to be monitored and decodes packets detected using those DL RUs. Subsequently, the UE, which is mobile, enters a new zone. In step 510, the UE updates its LOMA-zone location by sending a location declaration message to the LOMA path manager 104. The location declaration message includes information such as an ID of the UE and an ID of the new LOMA-zone. In response to receiving the location declaration message, in step 512 the LOMA path manager 104 updates its location table by updating the entry matching the ID of the UE in the message so that the UE ID is associated with the LOMA-zone ID. At a point in time, the UP GW 108, with router functionality, may receive data packets from the wider network addressed to the UE. The UP GW 108 may not have entries for the UE in its local routing table therefore, in step 514, the UP GW 108 (router) requests the location information of the UE from the LOMA path manager 104. In response to the location request message received from the UP GW 108, the LOMA path manager 104 will access the relevant DL MAPs to determine the NN which is best suited to forward the data packets to the target UE. In step 516, the LOMA path manager sends an ACK in the form of a location response message including the UE ID and selected NN ID. In step 518, the UP GW 108 sends DL packets to the NN indicated in the location response message. The NN receives the DL packets from UP GW 108 and accesses its NN-DL-MAP to determine the DL-RUs to be used to communicate with the UE. In step 520, the NN transmit the data packets to the UE using DL-RUs allocated to the LOMA-zone where the target UE is currently located.

Figure 5C:
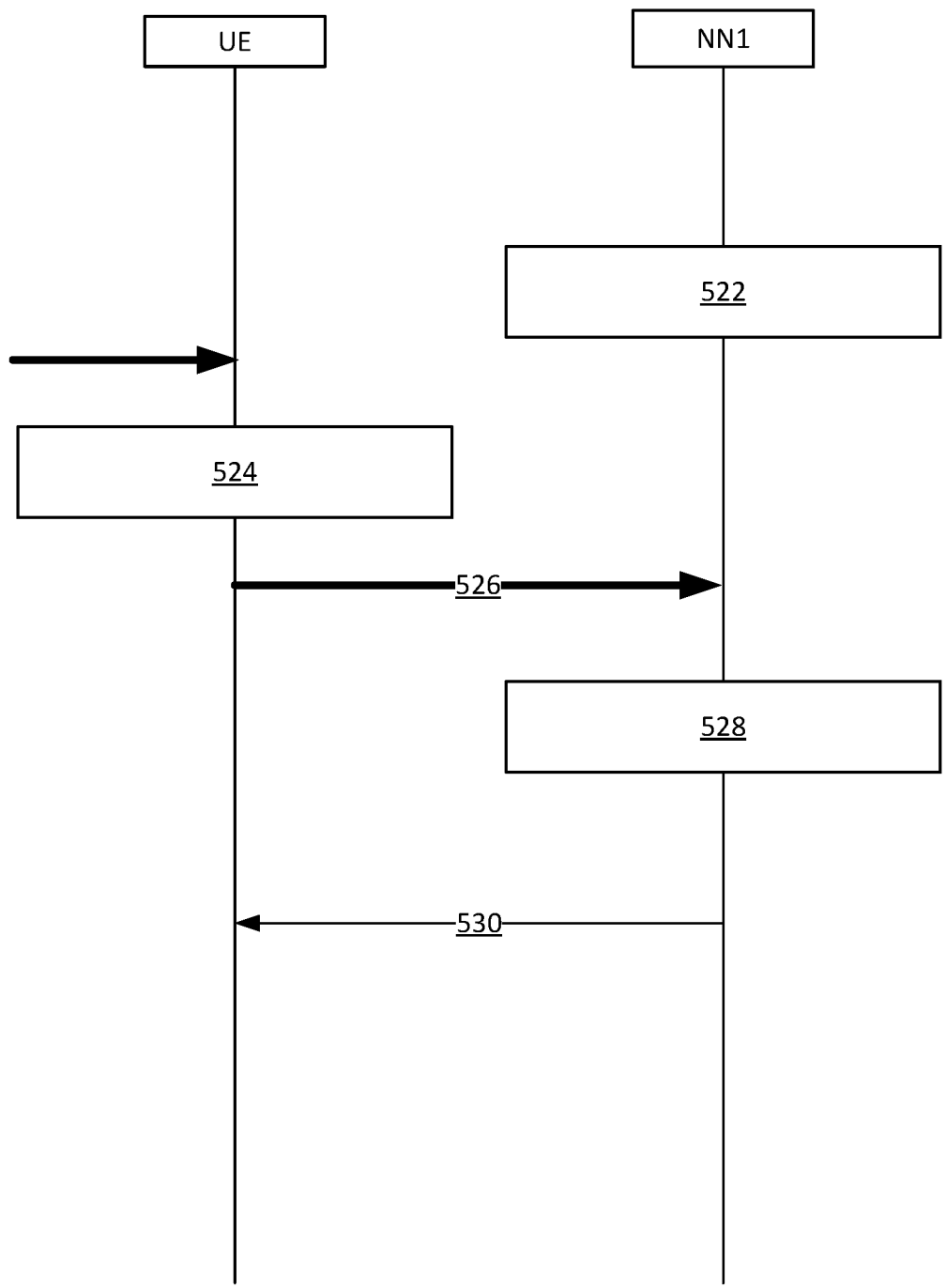
FIG. 5C illustrates a method for UL data transmission using LOMA MAPs, according to embodiments.

FIG. 5C illustrates a method for UL data transmission using MAPs, according to an embodiment. In step 522, based on their NN-UL-MAP, NNs continuously monitor UL-RUs allocated to LOMA-zones to detect transmitted signals. In step 524, UE determines that it will transmit data packets. Based on the LOMA-zone currently occupied by the UE, the UE checks its UE-UL-MAP and selects UL-RUs allocated to that LOMA-zone. In step 526, the UE transmits the data packets using UL-RUs for that zone. The UE may also retransmit packets based on certain rules such as not receiving an acknowledge from a NN within a certain time. In step 528, the NN detects and decodes the packets transmitted by the UE using the UL-RUs, which the NN is monitoring. In step 530, after the NN has successful received and decoded the packets, the NN sends an acknowledge information back to the UE.

An embodiment will be described with reference to FIG. 6 to illustrate data communications using LOMA using one-hop and multi-hop paths. One-hop and multi-hop communications may be used by wireless entities that have a fixed location or have no fixed location, such as a mobile UE. Communication is conducted between a sender entity 602 and receiving entity 604. Any messages or traffic data between 602 and 604 may be performed using either one-hop 600 or multi-hop 601 approaches. In an embodiment, the location of the target entity is known by the sender. Based on QoS and interference conditions, a sender may decide to use a one-hop path 610 to meet low latency requirements, or a multi-hop path through intermediate nodes 606 and 608 to meet interference restriction requirements. Other requirements may be used to determine the use of one-hop path 610 or multi-hop paths 612, 614, and 618.

In the case of a one-hop path 610, a sending entity 602 selects resource units using an appropriate LOMA MAP such as a high-power MAP which allows a long range communication distance. Note that if a low power transmission would suffice to transmit data from UE 602 to UE 604, either a high-power MAP or a low-power MAP could be used. The sending entity 602 transmits data to a target entity 604 along a path 610 without relaying data through intermediate nodes 606 or 608. The sender 602 first queries the appropriate Tx MAP for high power transmission and randomly selects one of the sets of resource units and transmit a message to the target entity 604. In this transmission, it may use the sender's 602 current zone ID and sender's code (related to sender ID) to process the transmitted signal. The target entity 604 receives the signal and may detect the received signal using the expected sender's information. The target entity 604 checks the target entity ID and further process payload data, if required. The target entity 604 may send an ACK message back to the sender entity 602.

In the case of a multiple-hop path through 612, 614, and 618, a sending entity 602 uses resource indicated in a Tx MAP with low power level to determine the Tx resources to use. The sending entity 602 may add a target zone ID or intermediate zone ID(s), or both IDs to the message and transmits the message over a first hop 612. At an intermediate entity such as 606 or 608, if the message is received and the ID of the intermediate entity's current zone is included, the entity forwards the message. This procedure is repeated until the message reaches the destination zone. The action at target entity 604 is the same as that for the case of the one-hop procedure.

In both the one-hop 600 and multi-hop cases 601, some fields in message, such as zone ID, determination entity ID, etc., can be encrypted or signed using configured encryption keys which may be organized on a per slice, per group, or other basis.

LOMA MAPs generated by the LOMA manager 102 are distributed to the wireless entities using a MAP deliver procedure and MAP delivery messages. NNs that receive a MAP delivery message directly from the LOMA manager 102 through a one-hop approach 600 can use a broadcast or multicast service (BMS) MAP to deliver the received MAP directly to other wireless entities.

If the MAP is received using a multi-hop approach 601, the NN which receives the MAP delivery message can transmit a MAP to nearby entities with target zone IDs in the MAP delivery message. Wireless entities which receives the MAP may decide whether they need to relay the MAP delivery message based on the relation between its current location and the location of target zones. If a wireless entity receives a MAP delivery message and one of target Zone ID matches the zone ID of its current location, the wireless entity is not required to relay it.

Location declaration messages may be used to transmit location information of the sending wireless entity to other wireless entities. In some embodiments, mobile wireless entities and wireless entities with no fixed location perform this procedure. In some embodiments LOMA MAPs include a set of dedicated Tx resources for the transmission of location declaration messages.

In embodiments, mobile wireless entities may use different methods for location declarations, including an 'autonomous' approach and an 'on-demand' approach. Using the autonomous approach, upon entering a new zone the mobile wireless entity selects a LOMA MAP (or could use a pre-configured MAP for purposes of location declaration) and transmits a location declaration message to the LOMA path manager 104 via a NN. Transmission may start using low transmission power using a specific low power Tx MAP. If an ACK is not received, the sender may use a higher power Tx MAP to increase the transmission power of the location declaration message. The sending wireless entity may progressively select higher power Tx MAPs until an ACK from an NN is received. If an ACK is not received using the Tx resources of the highest power level Tx MAP available, the procedure ends. Location declaration messages include a R-ID, which identifies a device within an area or a service or slice, and a zone ID of the wireless entity sender.

Using the on-demand approach, a wireless entity first receives a discovery message from another wireless entity. The wireless entity selects a LOMA MAP to use based on the zone ID indicated in the discovery message and transmits a location declaration message with a zone ID of where it is currently located and a R-ID. Using either the autonomous or on-demand procedures, some fields in messages such as the Zone ID, target entity ID, etc. may be encrypted or signed using configured keys. Keys may be specified on a per slice, per group, or other organizational basis.

For fixed entity, a location declaration procedure need only be performed once.

As part of the location declaration procedure a NN, after receiving a location declaration message from a wireless entity, can forward the location declaration message to a LOMA path manager 104, or keep the location information for the mobile entity, or both. The LOMA path manager, after receiving a location declaration message from a wireless entity, forwarded by a NN, updates the location record for that wireless entity. The location record may include information, such as, entity ID, and zone ID.

Embodiments include a procedure for a sending wireless entity to discover a target wireless entity or a group of target wireless entities in order to enable data traffic communications between wireless entities. Each zone listed in a LOMA MAP may include a set of dedicated Tx resources for transmitting discovery messages. A wireless entity transmits a discovery message starting from lowest power (using a LOMA MAP with a lowest transmission power level) and waits for a resulting location declaration message to be received. If a location declaration message is not received, the wireless entity will increase transmission power (using a LOMA MAP of next higher transmission power) and once again wait to receive a location declaration message. This procedure of increasing transmission power is repeated until the expected location declaration message is received (with a zone ID and R-ID), a Stop/NACK is received, or the highest available power level (using a LOMA MAP for the highest transmission power) is reached. A discovery message includes information such as the ID of the target entity, and/or network slice IDs, and the ID of the sender entity. In the case of multiple target wireless entities, multiple location declaration message will be received by the sending entity corresponding to the number of target wireless entities in the zones of interest. In some embodiments, this discovery procedure may be used to discover all near-by targets belong to a particular slice or other group of wireless entities. After the location declaration message of a target entity is available, the transmission power between these entities is determined and recorded for subsequent data transmission based on the transmission power of the discovery message that resulted in the sending wireless entity successfully receiving a location declaration message in response. Note that other power control mechanisms could also be used. At the conclusion of the target discovery procedure, traffic data communications between wireless entities may commence.

In some embodiments of the target discovery procedure, some fields in messages such as the zone ID, target entity ID, slice ID, sender ID, etc., can be encrypted or signed using configured encryption keys, which may be defined on a per slice or per group basis.

After the power control procedure between or among entities, traffic data communication can start.

In embodiments, a network node (NN) may be a fixed entity and is located in a zone that does not change or rarely changes. For example, when an NN is a cellular base station. A NN usually communicates with multiple wireless entities, many of which may be mobile such as handsets. The MAP used by an NN includes entries based on the location of a target wireless entity that the NN wants to communicate with. In comparison, the MAP used by a non-fixed wireless entity may be based on that wireless entity's location.

In a DL MAP for an NN, for example from an NN to a UE, for each zone, transmission resources that may be used by the NN are indicated. An NN node, based on the location information of a target entity, obtained from the LOMA path manager 104 or directly from a mobile entity, select a Tx resources to transmit to the target entity.

In a UL MAP for an NN, for example from a UE to a NN, for each zone, the receiving resources that may be used by the NN are indicated. An NN node, based on the location information of a sending entity, monitors and attempts to detect signals using Rx resources indicated for the zone where the sending entity is located. In addition, for UL receiving, if a NN has no knowledge of the incoming UL transmission by the UEs, the NN needs to monitor all of UL-RUs within its NN-UL-MAP.

In embodiments, a MAP may be used by customer entities and mobile entities to indicate the transmission resource and receiving resource for each zone. For transmissions, an entity checks the MAP entry for the zone where it is currently located to determine the transmission resource to use based on its current location, then transmits. For receiving, a wireless entity checks the MAP entry for the zone where it is currently located and determines the Rx resources that it must monitor to receive transmissions.

Figure 7A:
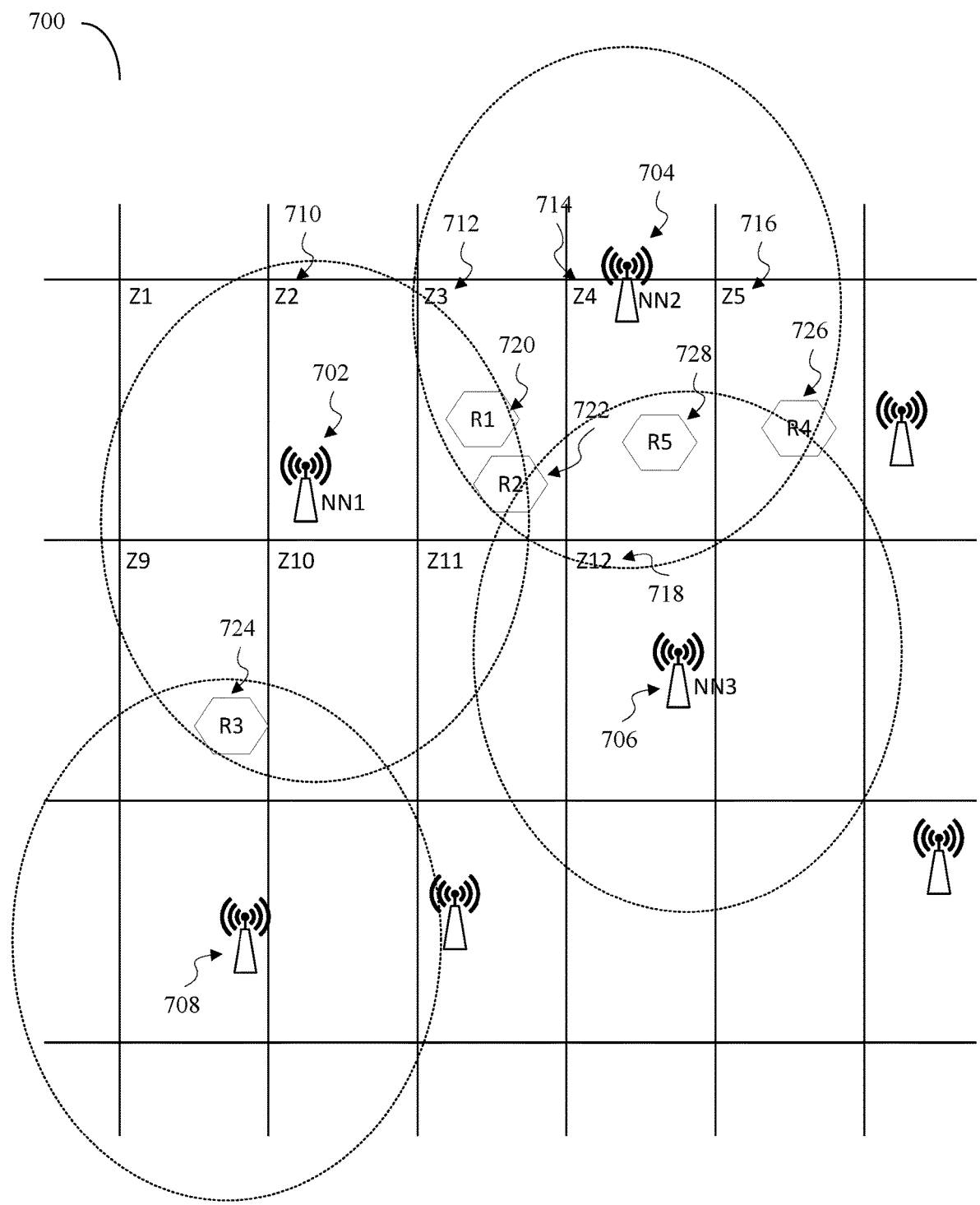
FIG. 7A illustrates an example where a NN transmits, at a high power, to a UE on the edge of a coverage area containing overlapping zones, according to embodiments.

FIG. 7A illustrates an embodiment where an NN transmits to a UE on the edge of a coverage area. The coverage area has an irregular deployment of NNs and is constrained to an area where the received SNR is higher than a threshold for high power transmission by NNs. The location of the NNs are fixed in zones. For example, NN1 702 is in zone 2 710, NN2 704 is in zone 4 714, and NN3 706 is in zone 12 718. In this embodiment, the Tx MAP 800 (see FIG. 8) used by an NN includes Rx resources by target wireless entity for each zone. In some cases, some zones are covered by multiple NNs such as in zone 3 712, which is covered by NN1 702 and NN2 704 and these zones will have a different set of Tx resources allocated to the NNs. For example, in the overlap region, the Tx and Rx resources may be mutually orthogonal to avoid interference. Each of the NNs stores a set of LOMA MAPs. When an NN wants to transmit to a wireless entity, it first determines the zone in which the target entity is located. The NN, accesses the available Tx resources for the zone where the target wireless entity is located and selects a Tx resource for transmission. The selection of a Tx resources from multiple available Tx resources may be done randomly. The target wireless entity is aware of which zone it is located in and consults its Rx MAP to know which Rx resources to use to detect the DL message targeted at it. Communications between two NNs may use this same method.

Figure 7B:
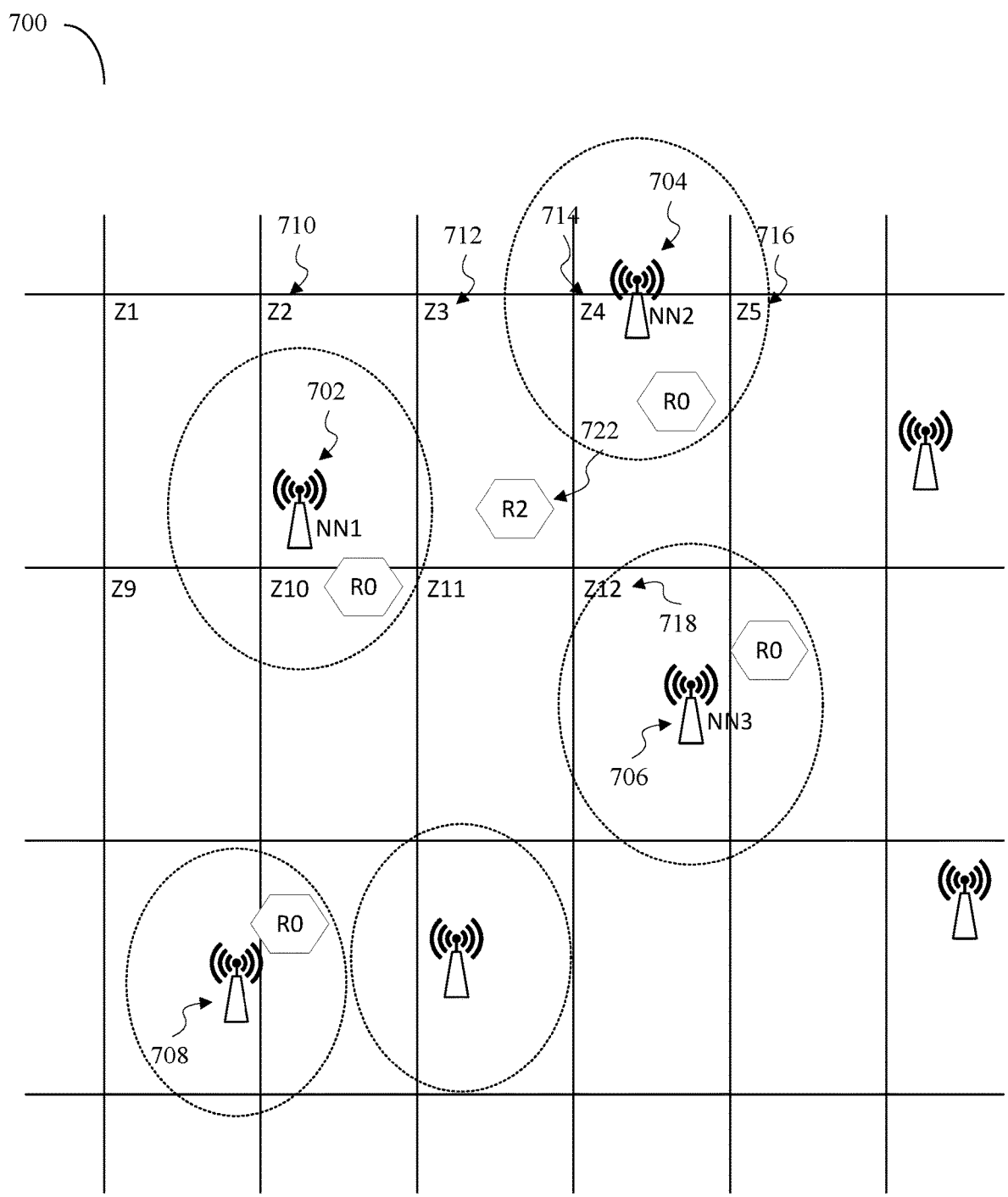
FIG. 7B illustrates an example where a NN transmits, at a low power, to a UE on the edge of a coverage area with non-overlapping zones, according to embodiments.

FIG. 7A illustrates an embodiment where NNs transmit at power levels sufficiently high to create overlapping LOMA-zones. RUs R1 through R5 (references 720, 722, 724, 726, and 728 respectively) may be used by NNs to communicate with UEs in their coverage areas. RUs may be used by multiple NNs as long as any mutual interference is within a tolerable level. FIG. 7B illustrates an embodiment where NNs transmit at power levels sufficiently low to have non-overlapping LOMA-zones. In this case RU set, R0, may be reused by all NNs with non-overlapping LOMA-zones to server UEs within their coverage zones.

FIG. 8 illustrates the Tx MAP 800 for NN1 702 of FIG. 7A. NN1 has MAP entries for Z1, Z2, Z3, Z9, and Z10. Zones 1, 2, and 10 are no overlap zones as only NN1 covers these zones. Zone 3 has an overlap with NN2 704, and zone 9 has an overlap with NN 708. To transmit to a wireless entity located in zone 3, NN1 would utilize the Tx resource, R1 as indicated in the MAP 800.

FIG. 9 illustrates the Tx MAP 900 for NN2 704 of FIG. 7A. NN2 has MAP entries for Z3, Z4, and Z5. Zones 3, 4, and 5 are overlap zones. Zone 3 has an overlap with NN1 702, zone 4 has an overlap with NN3 706, and zone 5 has an overlap with another NN. To transmit to a wireless entity located in zone 4, NN2 would utilize the Tx resource, R5 as indicated in the MAP 900. Note that if our area had defined zones above Z3, Z4, and Z5, these would be no overlap zones.

Figure 10:
FIG. 10 illustrates a Rx MAP according to an embodiment.

FIG. 10 illustrates a Rx MAP 1000 for a target wireless entity within the coverage area. The target wireless entity knows the zone it is located in and can monitor the resources indicated in the Rx MAP 1000 for that zone to receive transmissions from NNs. For example, with reference to FIG. 7A, if a target wireless entity was located in zone 3 712, it would monitor Rx resources R1 720 and R2 722. For example, a UE-DL-MAP can define substantially all UEs that could be targets for transmissions. The UE-DL-MAP can include a substantial areas which may cover a plurality of LOMA zones.

FIG. 7A also illustrates an embodiment where a NN transmits to a UE located towards the center of the coverage area. The coverage area has an irregular deployment of NNs. The location of the NNs are fixed in zones. For example, NN1 702 is in zone 2 710, NN2 704 is in zone 4 714, and NN3 706 is in zone 12 718. In this embodiment, for any zone where there are no coverage overlaps between NNs the same sets of transmission resources are allocated to each NN. Each of the NNs stores a set of LOMA MAPs. When an NN wants to transmit to a wireless entity, the NN first determines the zone in which the target entity is located. The NN, accesses the available Tx resources for the zone where the target wireless entity is located and selects a Tx resource for transmission. The selection of Tx resources to use from multiple available Tx resources may be done randomly. The target wireless entity is aware of which zone it is located in and consults its Rx MAP to know which Rx resources to use to detect the DL message targeted at it. Communications between two NNs may use this same method.

Figure 11A:
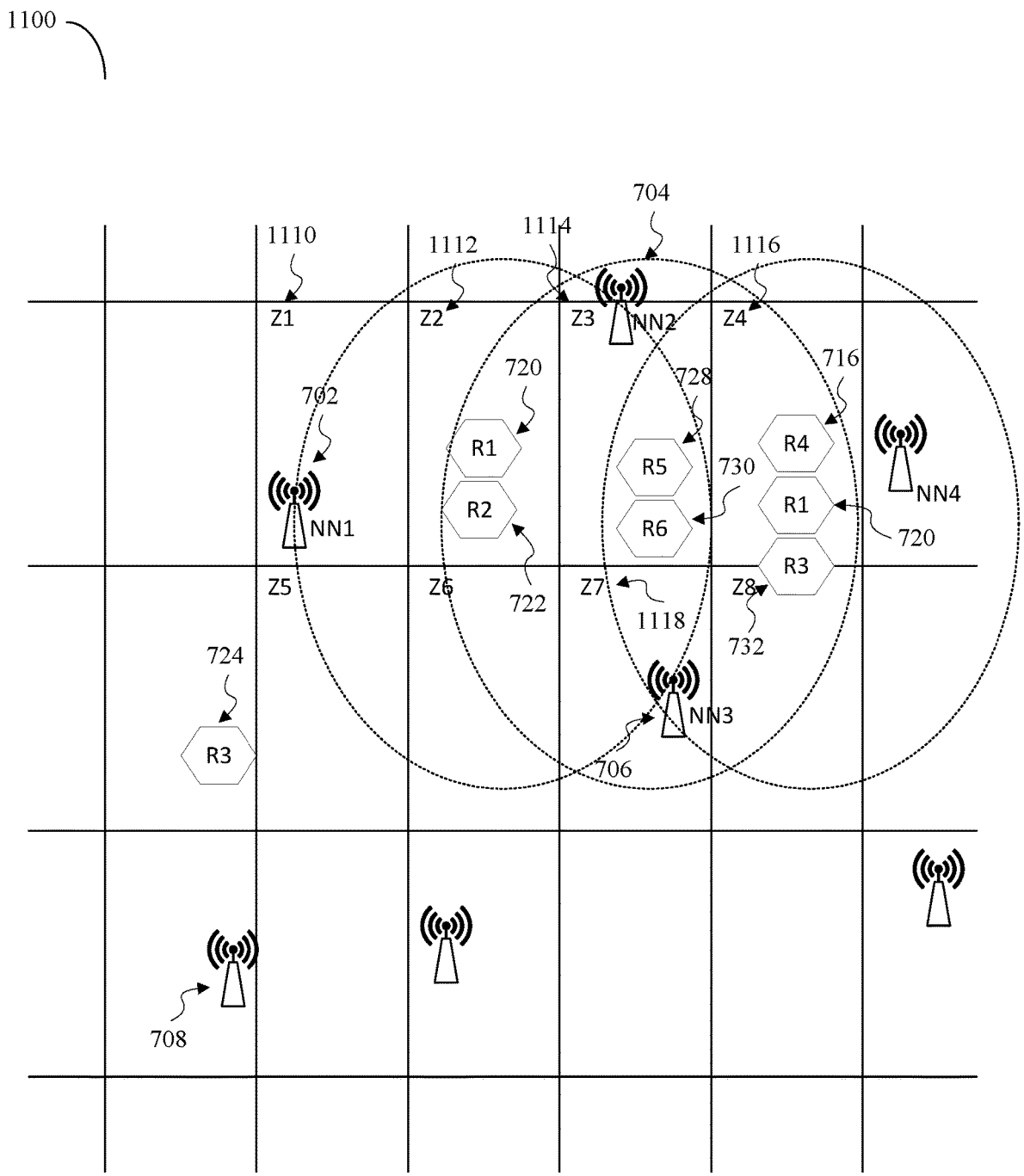
FIG. 11A illustrates an example where a wireless entity, such as a UE, transmits, at a high power, UL data to a NN towards the edge of the coverage area, according to embodiments.

FIG. 11A illustrates an embodiment where a wireless entity, such as a UE, transmits UL data to an NN towards the edge of the coverage area. The coverage area has an irregular deployment of NNs. The location of the target NN is fixed in a zone. For example, NN1 702 is in zone 2 1112, NN2 704 is in zone 3 1114, and NN3 706 is in zone 7 1118. In this embodiment, the wireless entity accesses a MAP with records indicating Tx resources by edge NNs by zones. Based on the zone that the target NN is located in the, wireless entity randomly selects a set of Tx resources from the available Tx resources for that zone and transmits data. Based on its Rx MAP, the target NN monitors Rx resources for possible UL transmissions from wireless entities. Communications between two NNs may use this same method.

Figure 11B:
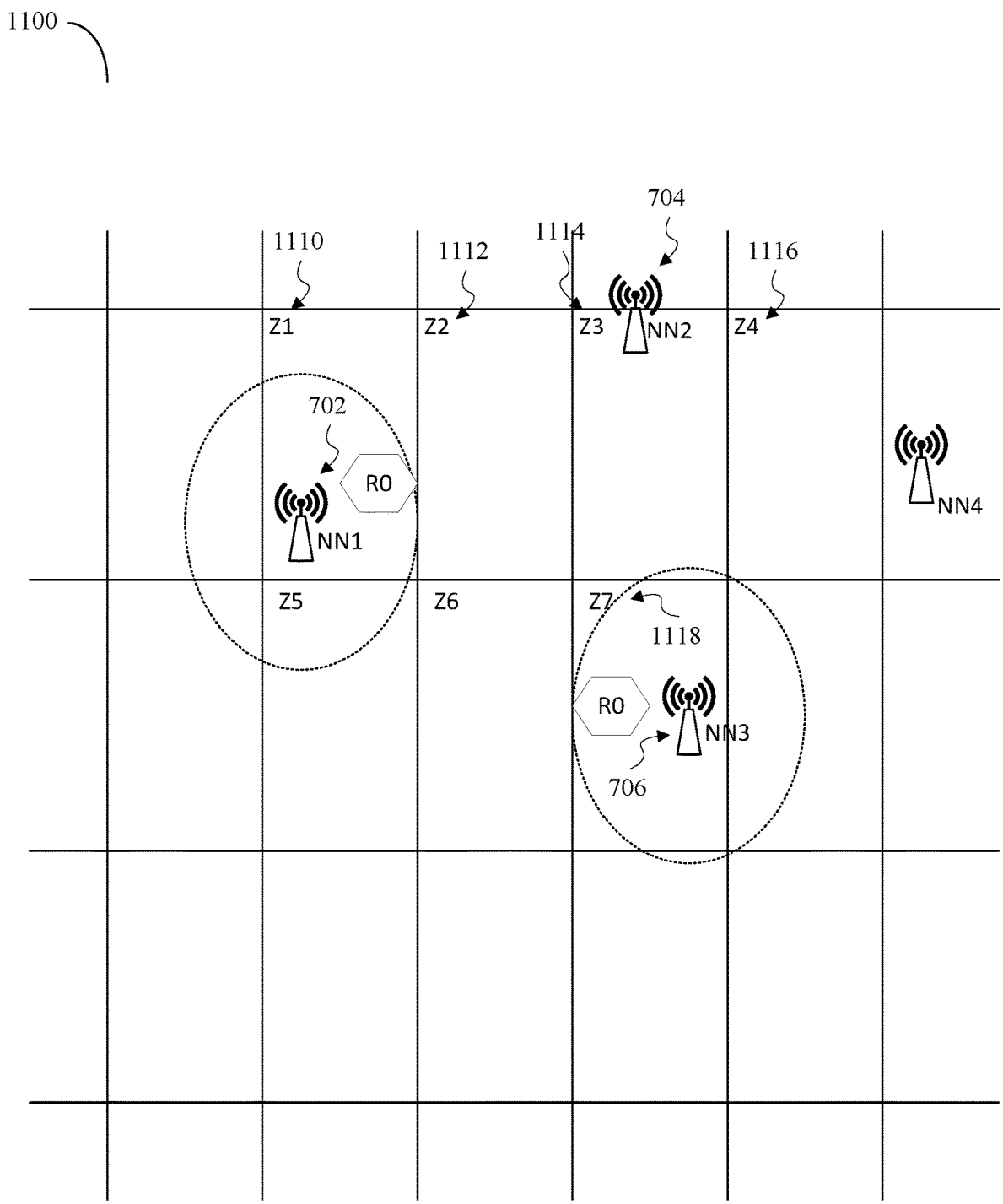
FIG. 11B illustrates an example where a wireless entity, such as a UE, transmits at a low power, UL data to a NN towards the edge of the coverage area, according to embodiments.

FIG. 11A may also be used to illustrate an embodiment where UEs are transmitting at a higher power level. NNs 1 through 4 are distributed in different geographic zones. UEs in zone 2 1112, zone 3 1114, and zone 4 1116 are transmitting at higher power transmission levels. Allocated UL-RUs are overlapping and RUs 1 through 6 (references 720, 722, 732, 716, 728, and 730 respectively) are allocated to the edges of the coverage areas. FIG. 11B illustrates the case when lower power transmission is used by UEs and UL RUs are allocated in non-overlapping zones. Assuming there are UEs in each of zone 1 1110 and zone 7 1118. R0 is a set of UL-RUs that may be reused by UEs closer to NNs where LOMA-zones do not overlap0.

FIG. 7A illustrates an embodiment where NNs transmit at power levels sufficiently high to create overlapping LOMA-zones. RUs R1 through R5 may be used by NNs to communicate with UEs in their coverage areas. RUs may be used by multiple NNs as long as any mutual interference is within a tolerable level. FIG. 7B illustrates an embodiment where NNs transmit at power levels sufficiently low to have non-overlapping LOMA-zones. In this case RU set, R0, may be reused by all NNs with non-overlapping LOMA-zones to server UEs within their coverage zones.

Figure 12:
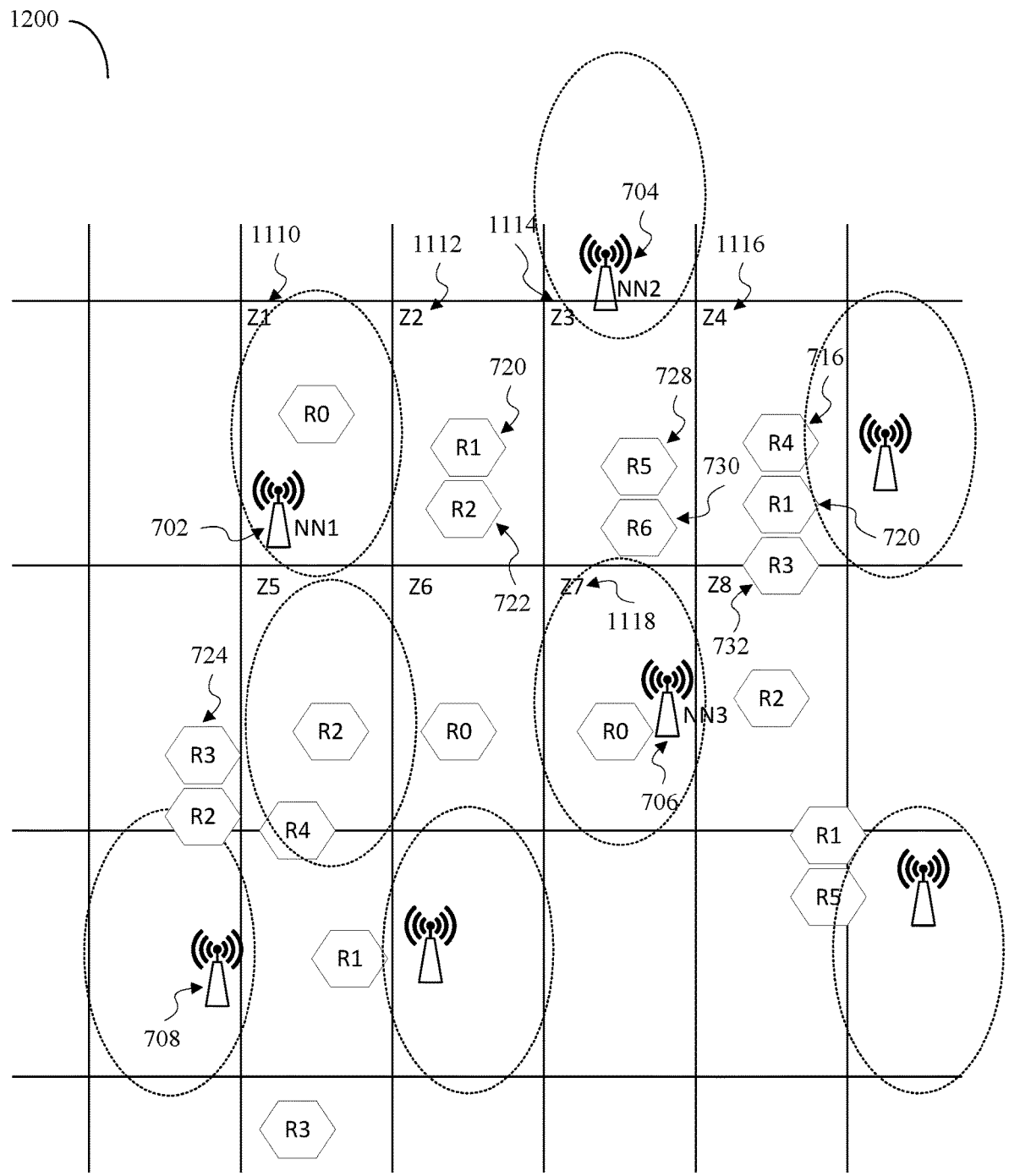
FIG. 12 illustrates an example where a wireless entity, such as a UE, transmits UL data to a NN towards the center of the coverage area, according to embodiments.

FIG. 12 illustrates an embodiment where a wireless entity, such as a UE, transmits UL data to an NN towards the center of the coverage area. The coverage area has an irregular deployment of NNs. The location of the target NN is fixed in a zone. For example, NN1 702 is in zone 1 1110, NN2 704 is in zone 3 1114, and NN3 706 is in zone 7 1118. In this embodiment, the UL MAPs for the wireless entities located in the center of zones use low power MAPs. The wireless entity accesses a MAP with records indicating Tx resources by NNs by zones. Based on the zone that the target NN is located in, the wireless entity randomly selects a set of Tx resources from the available Tx resources for that zone and transmits data. Based on its Rx MAP, the target NN monitors Rx resources for possible UL transmissions from wireless entities. Communications between two NNs may use this same method.

FIG. 13 illustrates the Tx MAP 1300 for UL data from a wireless entity as illustrated in FIG. 12. NN1 has MAP entries for zones 1 to 8. To transmit to a NN located in zone 3, the wireless entity could utilize either of Tx resources, R5 or R6, for example a defined in the UE-UL-MAP. In some embodiments, the wireless entity will randomly select between R5 and R6 for UL transmissions.

FIG. 14 illustrates the Rx MAP 1400 for NN1 702 of FIG. 12 to receive UL transmissions from a wireless entity. NN1 has MAP entries for Z1, Z2, and Z5 for example a defined in the NN-DL-MAP for NN1. NN1 must monitor R0 for transmissions from a wireless entity in zone 1, and R2 for transmissions from a wireless entity in zones 2 or 5.

FIG. 15 illustrates the Rx MAP 1500 for NN2 704 of FIG. 12 to receive UL transmissions from a wireless entity. NN2 has MAP entries for Z2, Z3, and Z4. NN2 must monitor R2 for transmissions from a wireless entity in zone 2, R5 for transmissions from a wireless entity in zone 3, and R4 for transmissions from a wireless entity in zone 4.

FIG. 16 illustrates an embodiment of a point-to-point MAP (P2P-MAP) that may be used by both fixed and mobile wireless entities. A P2P-MAP is populated based on the target discovery procedure described above. The P2P-MAP 1600 includes sets Tx RUs and sets of Rx RUs for zones or LOMA-zones of interest. More than one Tx RU and more than one Rx RU may be specified for each zone ID. Each set of resources includes parameters such power, beamforming, time, carrier, resource block, etc.

In an embodiment, a target wireless entity, such as a UE, may be discovered using any number of methods including a sending wireless entity discovering target wireless entities, and a target wireless entity declaring its location autonomously or on-demand, in response to a request. For example, discovery and location declaration can be used for pier to pier (P2P) connection establishment.

In the case of a sending UE discovering target wireless entities, a sending UE transmits a discovery message that includes a target R-ID and sender UE ID. The sender UE starts with the lowest transmission power (using a S-RU with the lowest transmission power level) and subsequently increases the transmission power using a S-RU with the next higher transmission power until one of the following events occurs. An expected location declaration message is received from the target UEs, a stop message is received, or the sender UE reaches the high highest power level (using an S-RU with the highest power level.)

Discovery messages may include information such as the R-ID (which may be the UE ID of a target entity), a slice IDs (used to discover all near-by targets belong to a slice), the ID of the sender entity, or any combination of the above.

Once the location of a target entity is known, the transmission power between these entities is negotiated for subsequent data transmission using a power control procedure for P2P communication.

In embodiments, messages between wireless entities may be encrypted or signed using configured encryption keys which may be set on a per slice, group, etc. In some cases, only selected fields are encrypted such as zone ID, target entity ID, slice ID, sender ID, etc.

For fixed target entity, it may be sufficient that a discovery procedure is performed only once.

In embodiments, a mobile wireless entity, such as a UE, may declare it's location through a location declaration procedure. Two examples of location declaration procedures are an "autonomous location update" and an "on-demand location update".

In the case of an autonomous location update, when a mobile wireless entity enters a new zone, the wireless entity transmits a location declaration message starting from low transmission power using a S-RU with low power and subsequently increases it's transmission power using a S-RU with a next higher transmission power until one of the following event occurs. An ACK message is received, a stop message is received, or the wireless entity reaches the highest transmission power level (using a S-RU with the highest transmission power). The location declaration message may include the R-ID of the wireless entity and the zone ID of the zone the wireless entity has entered. In this case, the R-ID may be any types of ID that may be used to identify a UE within an area, an ID to identify a slice that the wireless entity belongs to, a service of the wireless entity, or any combination of the above.

In the case of an on-demand location update, a wireless entity, such as a UE, received a request, such as a discovery message, for the wireless entity to perform a location declaration. In response to the request, the wireless entity transmits a location declaration message that may include any of a zone ID and an R-ID, as described for the declaration message in the case of an autonomous location update.

In above procedures, some fields in the exchanged message may be encrypted or signed using encryption keys configured on a per slice, per group, or other basis. Examples of fields that may be encrypted are zone ID, target entity ID, etc. In these case of wireless entities with a fixed location, these location declaration procedures may be performed once.

Figure 6:
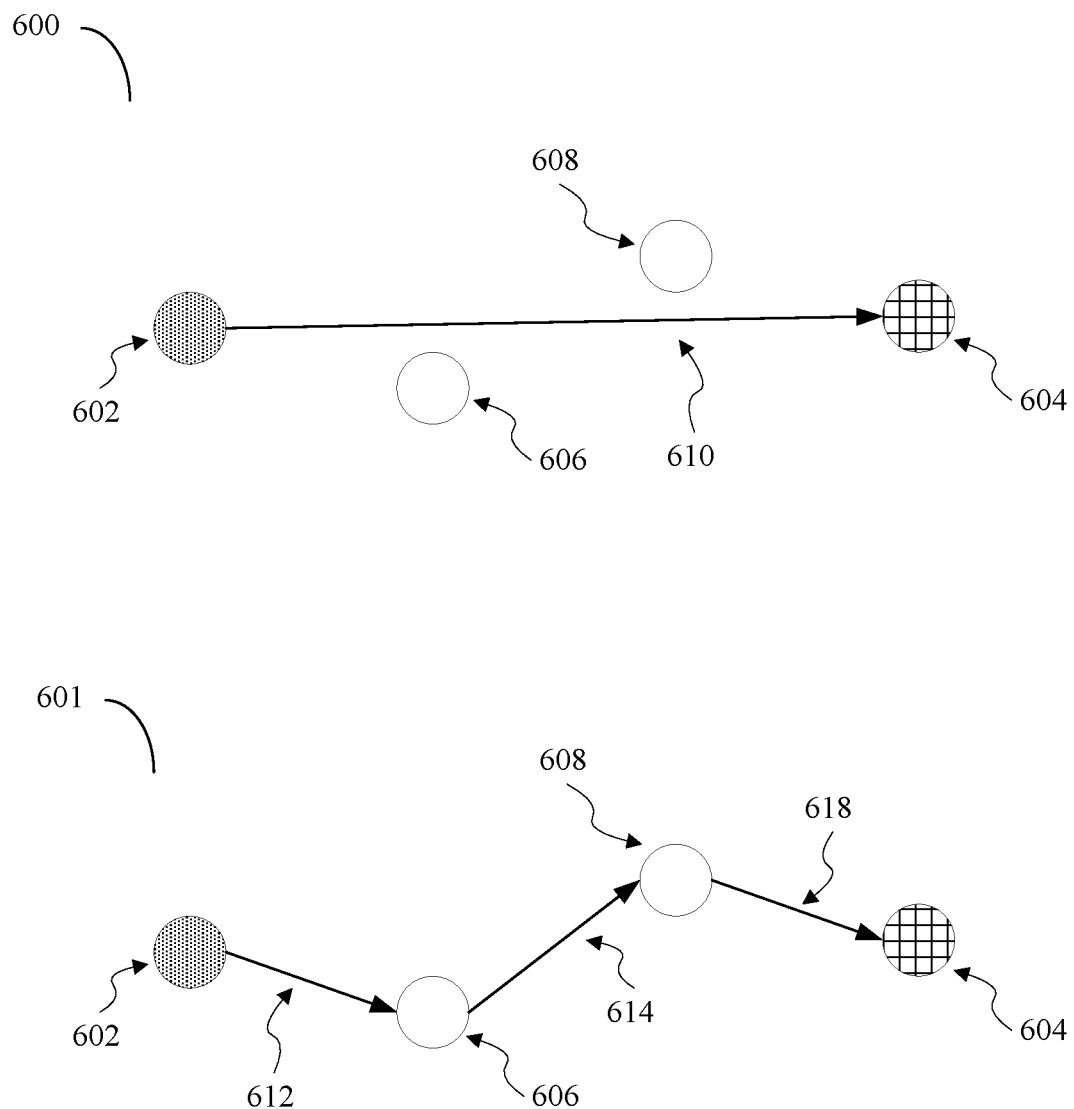
FIG. 6 illustrates one-hop and multi-hop transmissions according to embodiments.

With reference to FIG. 6, in embodiments, one-hop or multi-hop, P2P data communication may occur between a sender wireless entity 602 and a target wireless entity 604. If required, a discovery procedure such as a discovery of target UE procedure or a location declaration procedure may be performed to determine the location of the target wireless entity 604. At this point, the location of the target wireless entity 604 is know or may be determined by the sender wireless entity 602, and the required transmission power level is also known or may be determined. Based on QoS requirements and interference condition, the sender wireless entity 602 determines whether to use a one-hop (e.g., low latency requirement) or multi-hop transmission. One-hop transmissions result in a lower latency while a multi-hop transmission may be used to avoid or mitigate interference restrictions in the area.

In the case of the sending wireless entity 602 using a one-hop transmission, the sending wireless entity 102 accesses a P2P-MAP and selects resource units matching the appropriate power level required. The sender wireless entity 602 may use its current zone ID and a sender code related to its own ID to access the P2P-MAP and, based on the P2P-MAP entry, randomly select a transmit RU. Data transmission may then be done directly to the target wireless entity 604 without relaying transmissions through intervening wireless entities such as wireless entity 606 or wireless entity 608. The target wireless entity 604 detects and received the signal using the expected sender wireless entity's information. It may verify the transmission's destination entity ID and further process any received payload if required. Optionally, an ACK message may be returned to the sender wireless entity 602.

In the case of the sender wireless entity 602 using a multi-hop transmission, the sender wireless entity has the option of using P2P RUs with lower power. In the transmitted message, the sender wireless entity 602 may indicate a destination zone ID, any intermediate zone IDs along the path 610. When intermediate wireless entities such as wireless entity 606 or wireless entity 608 receive a multi-hop message, they check the zone IDs of the message to determine if they are in one of the listed intermediate zones. If this is the case, they forward the message along path 610. This procedure is repeated by wireless entities in intermediate zones until the message reached the destination zone. When the data transmission message is received by the destination wireless entity 604 it is processed as in the one-hop case, described above.

For both the one-hop and multi-hop P2P transmission cases, some fields in the transmitted messages may be encrypted or signed using configured encryption keys which may be on a per slice, per group, or other basis. Examples of fields that may be encrypted include zone ID, determination entity ID, etc.

In embodiments, the sender wireless entity will access the MAP entry for the zone that the target wireless entity is located in. If more than one Tx resources is listed for that zone, the Tx resource may be selected randomly from the listed Tx resources. The selected Tx resource is then used to transmit data to the target entity. The transmission may include information to help identify the sending entity such as an entity ID, zone ID, etc. The target entity may also use the MAP to monitor the Rx resource for the zone in which it is located in order to receive the message from the sending entity. Both one-hop and multi-hop transmission may be performed using a P2P map where if an intermediate entity received the message and it is closer to the target entity than the sender entity is, it can relay the message towards the target entity.

An object of embodiments of the present invention is to provide a method and apparatus for managing network resources in a wireless network. In accordance with embodiments of the present invention, there is provided a method of managing network resources including a sending wireless entity accessing a location-based MAP to select a Tx resource for transmission to a target wireless entity. The sending wireless entity utilizes the Tx resource to transmit a message to the target wireless entity.

In a further embodiment, the Tx resource is selected from a plurality of Tx resources for the zone. In a further embodiment, the Tx resource is selected based on a zone in which the target wireless entity is located. In a further embodiment, the Tx resource is selected based on a zone in which the sending wireless entity is located.

In other embodiments, the MAP corresponds to a power level. In further embodiments, the Tx resource is randomly selected from the plurality of Tx resources. In further embodiment, the MAP further comprises an Rx resource for receiving a transmission from the target wireless entity wherein the sending wireless entity and the target wireless entity form a P2P network.

In accordance with other embodiments of the present invention, there is provided a method of managing network resources including a target wireless entity accessing a location-based MAP to select a Rx resource for receiving a transmission from a sending wireless entity. The target wireless entity monitors the Rx resource to receive a message from a sending wireless entity.

In further embodiments, the Rx resource is one of a plurality of Rx resources for the zone. In further embodiments, the Rx resource based on a zone in which the target wireless entity is located. In further embodiments the Rx resource based on a zone in which the sending wireless entity is located. In further embodiments, the Rx resource is randomly selected from the plurality of Rx resources.

In other embodiments, the method further includes the target wireless entity determining that that a final target of the message is another wireless entity and transmitting the message towards the final target of the message. In further embodiments, the target wireless entity accesses a location-based Tx MAP to determine a Tx resource for the final target of the message.

In accordance with other embodiments of the present invention, there is provided a method of managing network resources including a LOMA manager transmitting an environment learning request to a plurality of wireless entities. Each of the plurality of wireless entities located in a zone of a plurality of zones of a coverage area. In response to the environment learning request, the LOMA manager receives environment reports messages from the plurality of wireless entities. Each of the environment report messages comprising radio environment observations of the plurality of wireless entities. The LOMA manager utilizes the environment report messages to generate a MAP. The MAP includes a record of communications resources for each of the plurality of zones. The LOMA manager distributing the MAP to each of the plurality of wireless entities.

In further embodiments each of the records comprises Tx resources utilized when transmitting to a wireless entity in the zone indicated by the record. In other embodiments, each of the records comprises a transmission power level. In other embodiments, the MAP comprises a Tx MAP and an Rx MAP. In other embodiments, the MAP is customized for use by one of the plurality of wireless entities based on a characteristic of the one of the plurality of wireless entities. In further embodiments, each of the records comprises Rx resources to be monitored by a wireless entity when receiving communications in the zone indicated by the record.

As used herein, the term "about" should be read as including variation from the nominal value, for example, a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A system for managing network resources, the system comprising:
a plurality of wireless entities including a mobile wireless entity and a fixed location wireless entity; and
a plurality of computing devices, each of the plurality of computing devices including a processor and a memory storing instructions, the instructions when executed by the processor cause the plurality of computing devices to provide a location based media access (LOMA) map manager and a LOMA path manager, the LOMA map manager configured to generate and maintain a plurality of LOMA maps, each of the plurality of LOMA maps including a plurality of LOMA zones, wherein a plurality of wireless communications resources used for communication between the plurality of wireless entities are associated with each of the plurality of LOMA zones, the LOMA path manager configured to manage communications using the wireless communications resources between the wireless entities including managing network path routing for traffic data between network nodes and user equipments (UEs) based on the wireless communication resources allocated to each of the plurality of LOMA zones;
wherein one or more LOMA maps of the plurality of LOMA maps are used by at least one of:
a network node (NN) to determine in which LOMA zone a particular UE is located and to determine corresponding wireless communication resources to be used by the NN to transmit a data packet; and the particular UE to determine in which LOMA zone it is located and to determine corresponding wireless communication resources to be used to receive the data packet from the NN.

2. The system of claim 1 wherein the LOMA map manager communicates with the plurality of wireless entities to send and receive management messages to update the plurality of LOMA maps.

3. A method for managing transmission resources for a communication network, the method comprising:
  detecting, by a plurality of second wireless entities, one or more of high power pilot transmissions and low power pilot transmissions sent from a plurality of first wireless entities;
  each of the second wireless entities, transmitting to a location based media access (LOMA) map manager, a message including information indicative of a detected signal strength of the high power pilot transmission and a detected signal strength of the low power pilot transmission;
  wherein each of the plurality of first wireless entities is a network node (NN) and each of the plurality of second wireless entities is a user equipment (UE) and wherein the message transmitted by a particular UE includes a location at which the particular UE detected the high power pilot transmission and a location at which the particular UE detected the low power pilot transmission, the method further comprising:
  allocating, by the LOMA map manager, resources to each of a plurality of zones, the allocating at least in part based on the detected signal strengths of the high power pilot transmissions, the detected signal strengths of the low power pilot transmissions and the locations of the plurality of UEs, the resources and one or more zones associated with the resources are included in one or more LOMA maps, and wherein the one or more LOMA maps are used by at least one of:
  the NN to determine in which zone the particular UE is located and to determine corresponding resources to be used by the NN to transmit a data packet; and
  the particular UE to determine in which zone it is located and to determine corresponding resources to be used to receive the data packet from the NN.

4. The method of claim 3 wherein each of the LOMA maps includes a NN DL map and a UE DL map, the resources including downlink (DL) transmission resources and DL reception resources, wherein the NN DL map associates the DL transmission resources and the one or more zones and wherein the UE DL map associates DL reception resources and one or more zones.

5. The method of claim 4, wherein upon detection, by the particular UE, of one or more packets on the DL reception resources allocated to the one or more zones associated with the particular UE, the particular UE further decodes the one or more packets.

6. The method of claim 4, wherein upon receipt of one or more data packets destined for the particular UE by a gateway of the communication network, the method further comprises:
  communicating, by the gateway, with a LOMA path manager, regarding the particular UE;
  determining, by the LOMA path manager, location information of the particular UE;
  receiving, by the gateway, a current location of the particular UE or a NN associated with the particular UE; and
  routing, by the gateway, the one or more data packets to the NN associated with the particular UE, wherein routing is determined by checking an associated LOMA map.

7. The method according to claim 3, wherein when the particular UE enters a new zone or a new LOMA zone, the particular UE transmits a location declaration message indicating a change in zone or a change in LOMA zone.

8. The method of claim 7, upon receipt of the location declaration message, the method further comprises updating, by a LOMA path manager, UE location information.

9. A method for managing transmission resources for a communication network, the method comprising:
  detecting, by a plurality of second wireless entities, one or more of high power pilot transmissions and low power pilot transmissions sent from a plurality of first wireless entities;
  each of the second wireless entities, transmitting to a location based media access (LOMA) map manager, a message including information indicative of a detected signal strength of the high power pilot transmission and a detected signal strength of the low power pilot transmission;
  wherein each of the plurality of first wireless entities is a user equipment (UE) and each of the plurality of second wireless entities is a network node (NN), the method further comprising:
  sending, by each of the plurality of UEs to the LOMA map manager, a message including information indicative of a location of a particular UE, a high power pilot ID associated with the high power pilot transmission transmitted by the particular UE and a low power pilot ID associated with the low power pilot transmission transmitted by the particular UE.

10. The method of claim 9, further comprising:
  allocating, by the LOMA map manager, uplink (UL) transmission resources to each of a plurality of zones, the allocating at least in part based on the detected signal strengths of the high power pilot transmissions, the detected signal strengths of the low power pilot transmissions and the locations of the plurality of UEs, the allocation of the plurality of UL transmission resources stored in a LOMA map, and wherein the location of a particular UE is indicative of the one or more zones associated with the particular UE, wherein a particular detected signal strength of the high power pilot transmissions and a particular detected signal strength of the low power pilot transmissions are associated with the particular UE based on the high power pilot ID and the low power pilot ID.

11. The method of claim 10 wherein the LOMA map includes a NN UL map and a UE UL map, wherein the NN UL map associates UL reception resources with one or more zones and wherein the UE UL map associates UL transmission resources with the one or more zones.

12. The method of claim 11, wherein the NN UL map is used by a particular NN in order to identify one or more UL resources to be monitored for transmissions from one or more of the plurality of UEs.

13. The method of claim 11, wherein the UE UL map is used by a particular UE in order to identify one or more UL resources to be used for transmissions.

14. A system for managing transmission resources for a communication network, the system comprising:
  a plurality of user equipments (UEs) each including a processor and a memory storing first instructions; and a plurality of network nodes (NN) each including a processor and a memory storing second instructions;

the second instructions when executed by a respective processor cause the NN to detect one or more of high power pilot transmissions and low power pilot transmissions sent from a plurality of UEs; and the second instructions when executed by a respective processor further cause the NN to transmit to a location based media access (LOMA) map manager, a message including information indicative of a detected signal strength of the high power pilot transmission and a detected signal strength of the low power pilot transmission; and the first instructions when executed by a respective processor cause a particular UE to send to the LOMA map manager, a message including information indicative of a location of the particular UE, a high power pilot ID associated with the high power pilot transmission transmitted by the particular UE and a low power pilot ID associated with the low power pilot transmission transmitted by the particular UE.

15. The system of claim 14, wherein the LOMA manager is configured to allocate uplink (UL) transmission resources to each of a plurality of zones, the allocating at least in part based on the detected signal strengths of the high power pilot transmissions, the detected signal strengths of the low power pilot transmissions and the locations of the plurality of UEs, the allocation of the plurality of UL transmission resources stored in a LOMA map, and wherein the location of a particular UE is indicative of the one or more zones associated with the particular UE, wherein a particular detected signal strength of the high power pilot transmissions and a particular detected signal strength of the low power pilot transmissions are associated with the particular UE based on the high power pilot ID and the low power pilot ID.

16. The system of claim 15 wherein the LOMA map includes a NN UL map and a UE UL map, wherein the NN UL map associates UL reception resources with one or more zones and wherein the UE UL map associates UL transmission resources with the one or more zones.

17. The system of claim 16, wherein the NN UL map is used by a particular NN in order to identify one or more UL resources to be monitored for transmissions from one or more of the plurality of UEs.

18. The system of claim 16, wherein the UE UL map is used by a particular UE in order to identify one or more UL resources to be used for transmissions.

* * * * *